US010262409B2

(12) United States Patent
Dekel-Klein et al.

(10) Patent No.: US 10,262,409 B2
(45) Date of Patent: Apr. 16, 2019

(54) SYSTEM AND METHOD FOR GENERATING IMAGES FOR INSPECTION

(71) Applicant: ADVANCED VISION TECHNOLOGY (A.V.T.) LTD., Hod Hasharon (IL)

(72) Inventors: Maya Dekel-Klein, Hod Hasharon (IL); Chanan Gazala, Kfar Saba (IL)

(73) Assignee: ADVANCED VISION TECHNOLOGY (A.V.T.) LTD., Hod Hasharon (IL)

( * ) Notice: Subject to any disclaimer, the term of this patent is extended or adjusted under 35 U.S.C. 154(b) by 0 days.

(21) Appl. No.: 16/105,704

(22) Filed: Aug. 20, 2018

(65) Prior Publication Data
US 2019/0057499 A1    Feb. 21, 2019

(30) Foreign Application Priority Data
Aug. 21, 2017 (IL) .......................................... 254078

(51) Int. Cl.
*G06K 9/62* (2006.01)
*G06N 3/04* (2006.01)
(Continued)

(52) U.S. Cl.
CPC .......... *G06T 7/0006* (2013.01); *G06K 9/6228* (2013.01); *G06K 9/6256* (2013.01);
(Continued)

(58) Field of Classification Search
CPC .......... G06T 7/0006; G06T 7/001; G06T 7/73; G06K 9/6228; G06K 9/6256; G06K 9/6261; G06N 3/04; G06N 3/08
See application file for complete search history.

(56) References Cited

U.S. PATENT DOCUMENTS 5,162,899 A    11/1992 Naka et al.
5,164,837 A    11/1992 Hirosawa
(Continued)

FOREIGN PATENT DOCUMENTS

EP    1049047 B1    9/2006

OTHER PUBLICATIONS

Verikas, A., Malmqvist, K., Bergman, L. "Neural Networks Based Colour Measuring for Process Monitoring and Control in Multicoloured Newspaper Printing" Neural Comput & Applic (Year: 2000).*
(Continued)

*Primary Examiner* — Kim Y Vu
*Assistant Examiner* — Molly Delaney
(74) *Attorney, Agent, or Firm* — Merchant & Gould P.C.

(57) ABSTRACT

Method for generating a test-set for inspection of a design being printed by a printing-press, each color-unit in the printing-press prints a respective color. The design is composed of original-layers. Inspection includes determining the origin of at least one defect in the printed-design. The method includes the procedures of generating defective-layer or layers of the design, by introducing at least one selected defect to at least one selected original-layer, in a selected location or locations and combining layers using a trained-synthesis-neural-network. The layers include the defective-layer or layers and remaining ones of the original-layers. The trained-synthesis-neural-network provides a plurality of features respective of each pixel. The method also includes the procedure of generating the test-set from the output of the synthesis-neural-network. The test-set includes at least one synthesized-test-image. The synthesized-test-image includes at least one synthesized-defect at the selected location. The test-set is employed to determine the origin of the defect.

9 Claims, 25 Drawing Sheets

(51) Int. Cl.
*G06N 3/08* (2006.01)
*G06T 7/00* (2017.01)
*G06T 7/73* (2017.01)

(52) U.S. Cl.
CPC .............. *G06K 9/6261* (2013.01); *G06N 3/04* (2013.01); *G06N 3/08* (2013.01); *G06T 7/001* (2013.01); *G06T 7/73* (2017.01); *G06T 2207/10024* (2013.01); *G06T 2207/20081* (2013.01); *G06T 2207/20084* (2013.01); *G06T 2207/20221* (2013.01); *G06T 2207/30144* (2013.01)

(56) References Cited

U.S. PATENT DOCUMENTS

| | | | |
|---|---|---|---|
| 5,577,178 A | 11/1996 | Curry et al. | |
| 5,774,230 A | 6/1998 | Goto | |
| 6,295,374 B1* | 9/2001 | Robinson | G06K 9/036 348/95 |
| 7,040,232 B2 | 5/2006 | Van Holten et al. | |
| 8,208,170 B2 | 6/2012 | Mo | |
| 2002/0168099 A1 | 11/2002 | Noy | |
| 2008/0146767 A1* | 6/2008 | Wamprecht | C08G 18/4063 528/75 |
| 2008/0295724 A1* | 12/2008 | Lohweg | B41F 33/0009 101/484 |
| 2013/0155422 A1* | 6/2013 | Kuo | H04N 1/506 358/1.2 |
| 2015/0070428 A1* | 3/2015 | Sudo | B41J 2/04593 347/14 |
| 2016/0325542 A1 | 11/2016 | Menashe et al. | |
| 2018/0001657 A1* | 1/2018 | Yamanobe | B41J 2/04558 |

OTHER PUBLICATIONS

Yuanyuan Qu, "Color Prediction and Separation Models in Printing", Linköping Studies in Science and Technology Dissertation No. 1540—176 pages (2013).

Eric J. Stollnitz: "Reproducing Color Images with Custom Inks", A doctoral dissertation Department of Applied Mathematics, University of Washington—139 pages (1998).

A. Verikas, et al, "A New Method for Colour Measurements in Graphic Arts, Color Research and Application", vol. 24, No. 3 1999, pp. 185-196.

Lars Bergman: "Using Multicoloured Halftone Screens for Offset Print Quality Monitoring", Linköping Studies in Science and Technology Licentiate Thesis No. 1147—120 pages (2005).

\* cited by examiner

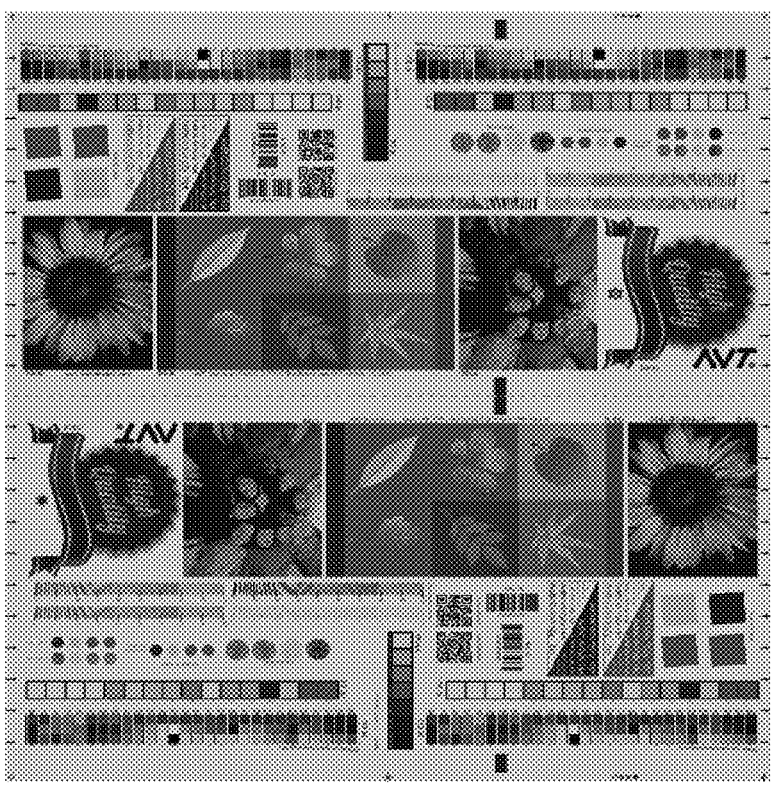
FIG. 4B ACQUIRED IMAGE
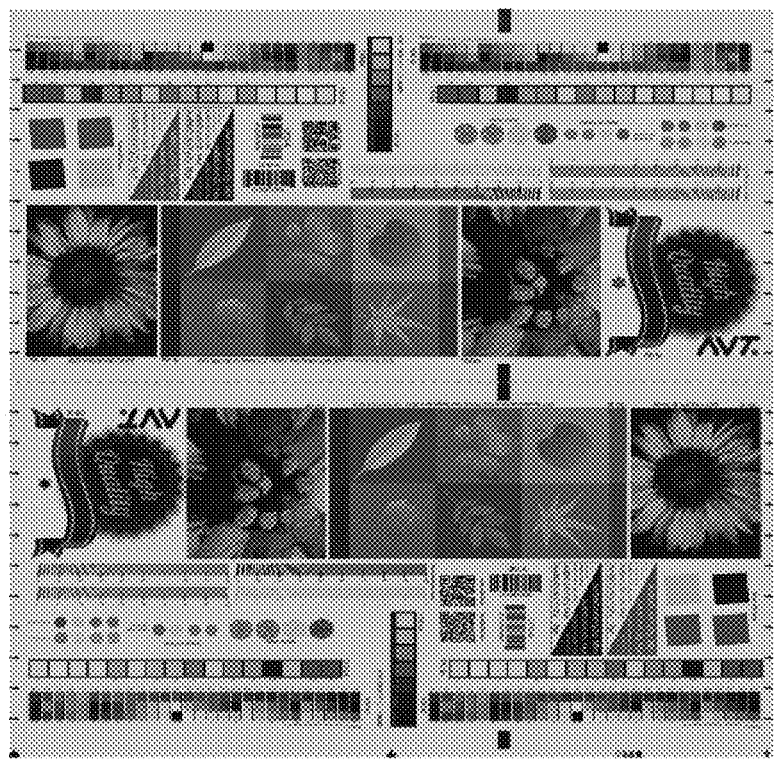
FIG. 4A SYNTHESIZED IMAGE

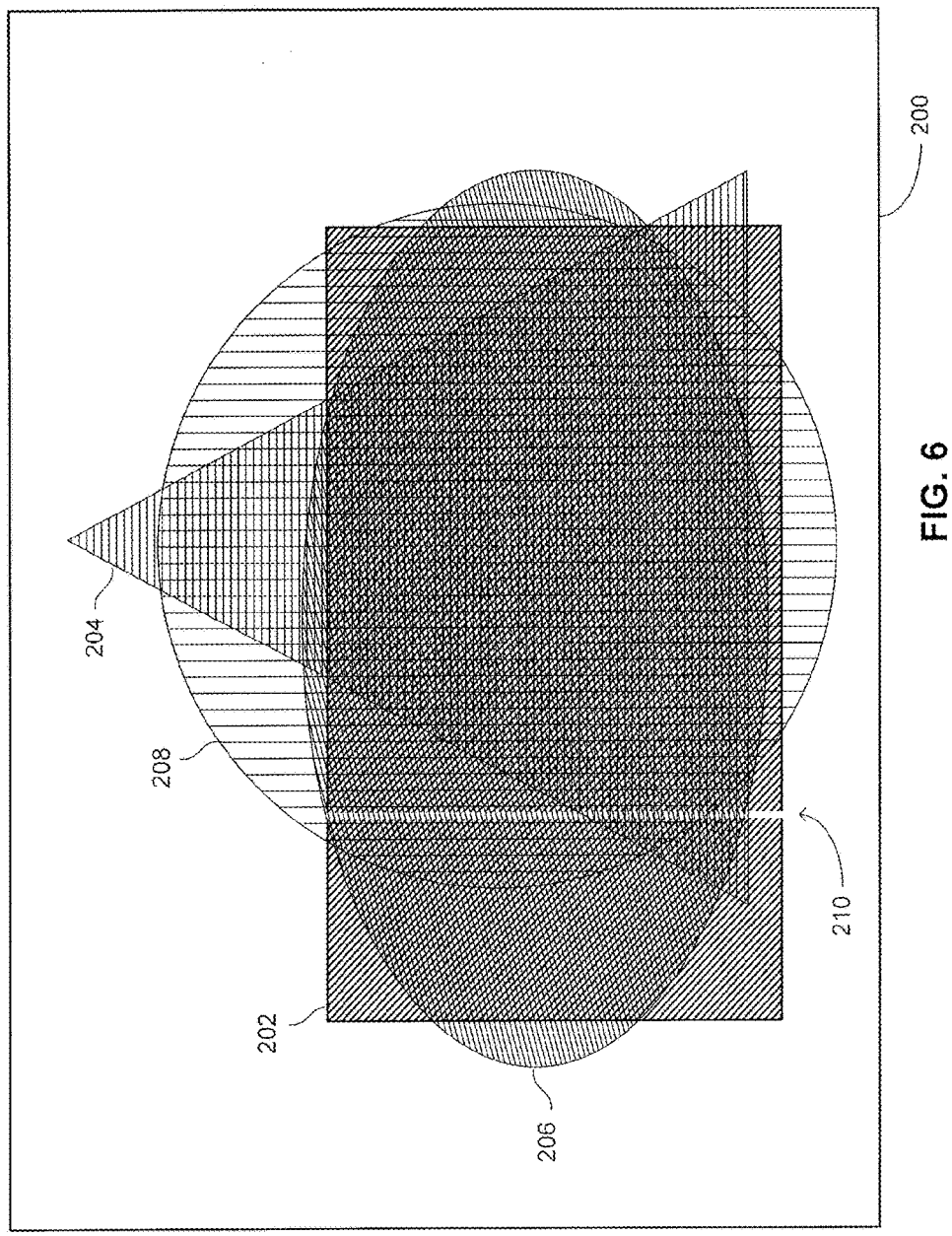

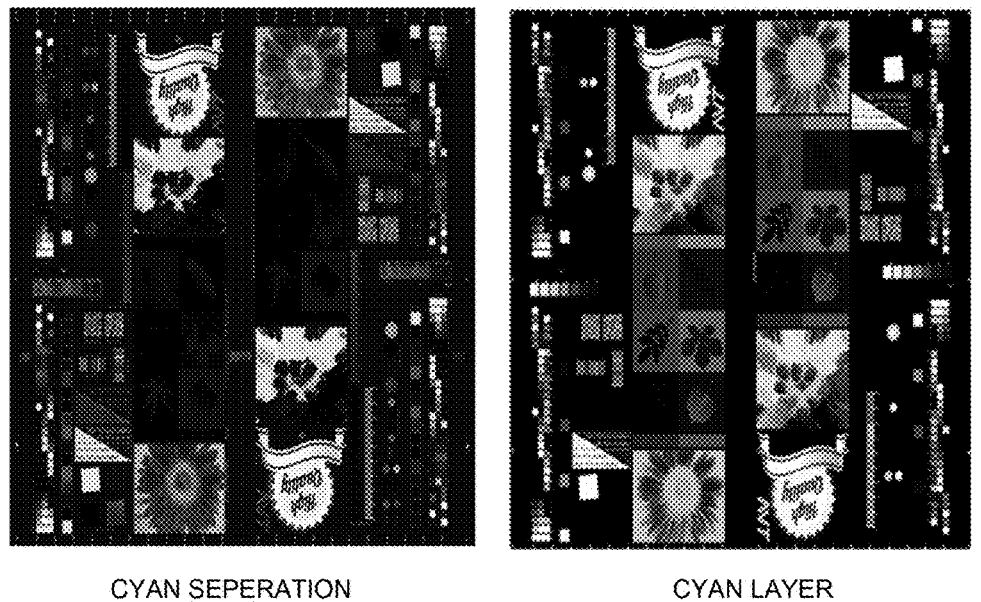
CYAN SEPERATION                CYAN LAYER
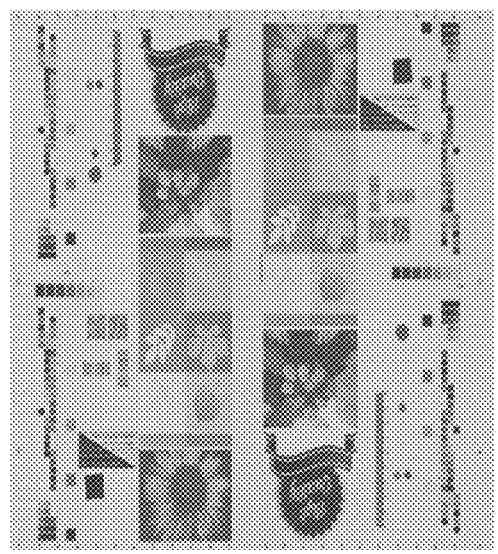
IMAGE OF PRINTED
CYAN IMPRESSION
FIG. 10B

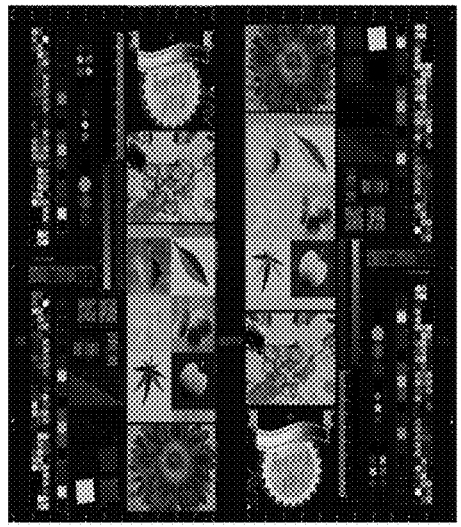
MAGENTA SEPERATION
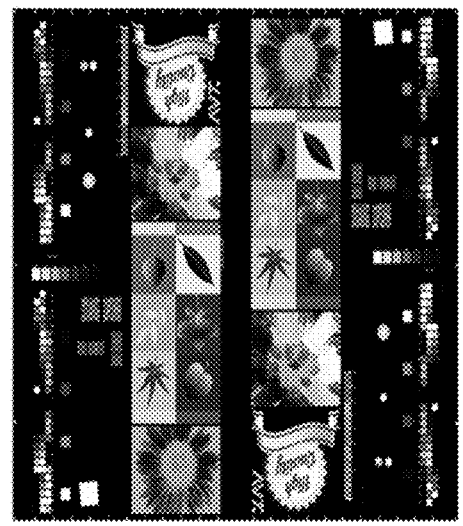
MAGENTA LAYER
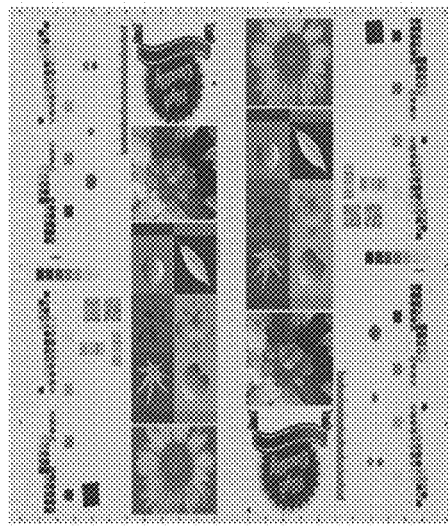
IMAGE OF PRINTED
MAGENTA IMPRESSION
FIG. 10C

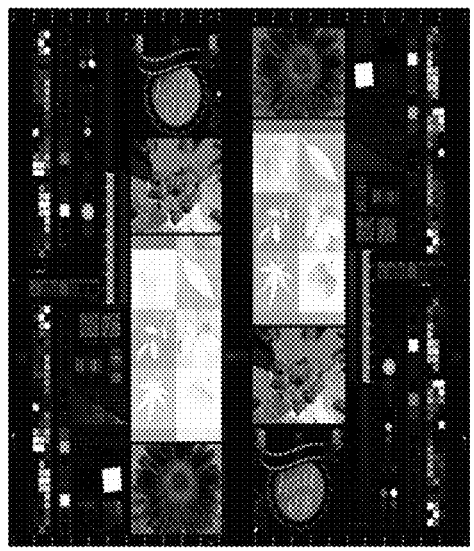
YELLOW SEPERATION
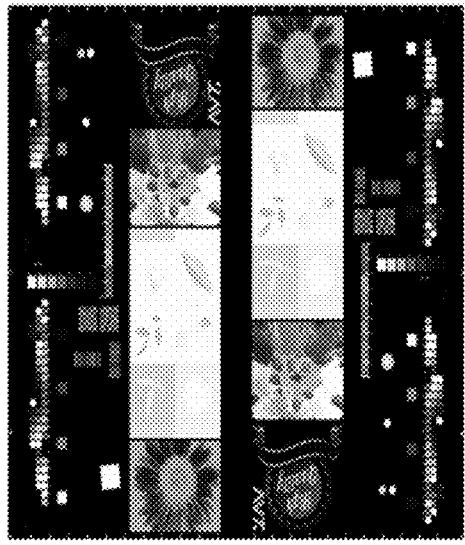
YELLOW LAYER
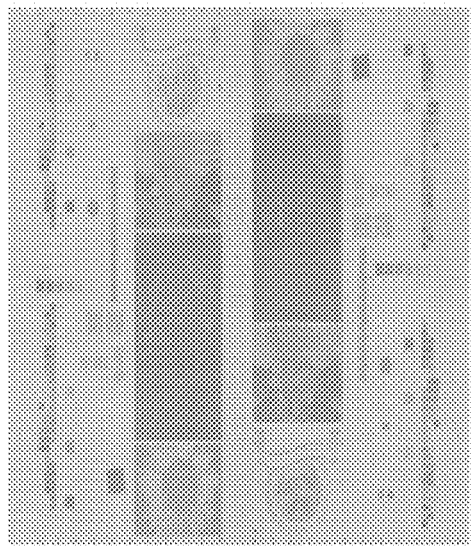
IMAGE OF PRINTED YELLOW IMPRESSION
FIG. 10D

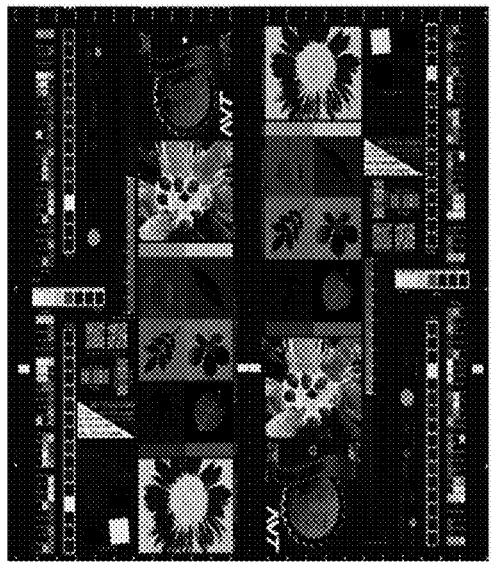
BLACK SEPERATION
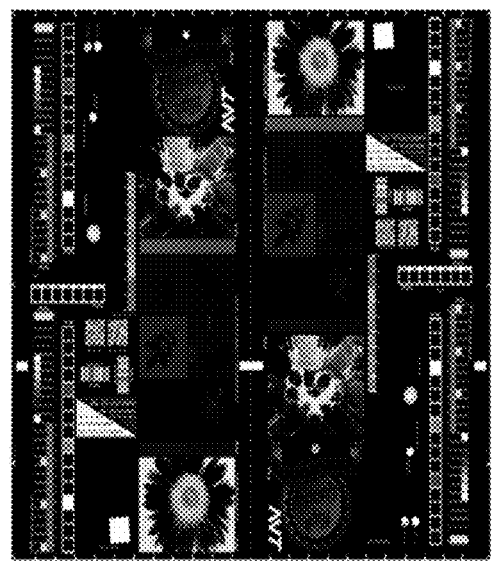
BLACK LAYER
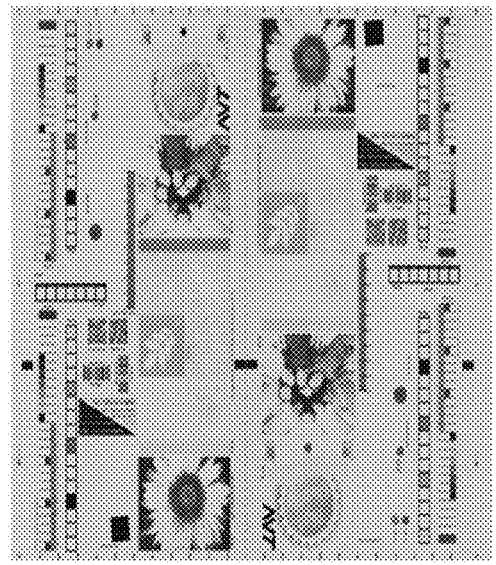
IMAGE OF PRINTED
BLACI IMPRESSION
FIG. 10E

| | | | | | | | | | |
|---|---|---|---|---|---|---|---|---|---|
| 0000 | 0000 | 0000 | 0000 | 0000 | 0000 | 0000 | 0000 | 0000 | 0000 |
| 0000 | 0000 | 0000 | 0100 | 0101 | 0101 | 0101 | 0101 | 0000 | 1000 |
| 0000 | 0100 | 0110 | 0110 | 0111 | 0111 | 1111 | 1111 | 1110 | 1000 |
| 0000 | 0100 | 0100 | 0111 | 1111 | 1111 | 1111 | 1111 | 1100 | 1000 |
| 0100 | 0100 | 1110 | 1111 | 1111 | 1111 | 1111 | 1111 | 1100 | 1000 |
| 1100 | 1100 | 1110 | 1111 | 1111 | 1111 | 1111 | 1111 | 1100 | 1000 |
| 0000 | 0100 | 1110 | 1111 | 1111 | 1111 | 1111 | 1111 | 1000 | 1000 |
| 0000 | 0000 | 0110 | 0111 | 0111 | 1111 | 1111 | 1111 | 1011 | 1000 |
| 0000 | 0000 | 0010 | 0011 | 0011 | 0011 | 0011 | 1011 | 1011 | 1000 |
| 0000 | 0000 | 0000 | 0000 | 0001 | 0001 | 0001 | 0001 | 0000 | 0000 |
| 0000 | 0000 | 0000 | 0000 | 0000 | 0001 | 0001 | 0000 | 0000 | 0000 |
| 0000 | 0000 | 0000 | 0000 | 0000 | 0000 | 0000 | 0000 | 0000 | 0000 |

FIG. 12B

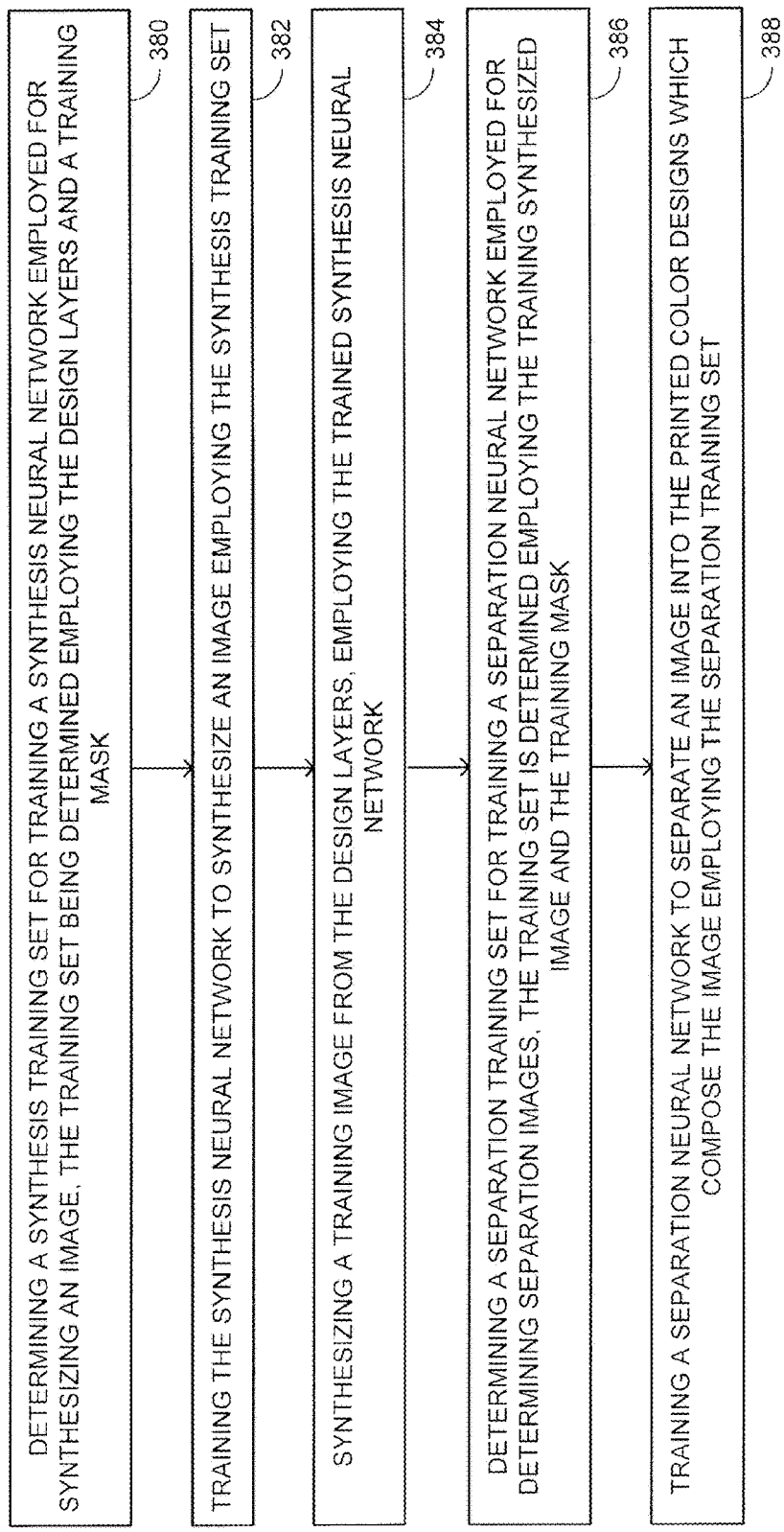

SYSTEM AND METHOD FOR GENERATING IMAGES FOR INSPECTION

FIELD OF THE DISCLOSED TECHNIQUE

The disclosed technique relates to inspection of printed material in general, and to methods and systems for generating images for inspection in particular.

BACKGROUND OF THE DISCLOSED TECHNIQUE

Printing presses, which are known in the art, print a design on a substrate. Typically, the design is composed of several color designs, each associated with a respective color. Each color design exhibits a respective topography. The printing press prints each color design in a predetermined order, thus producing the design on the substrate (i.e., the printed design). Typically, a design to be printed is provided in the form of a file (e.g., in Portable Document Format—PDF), which includes information relating to the different color designs (i.e., also referred to as 'layers') from which the design is composed, as well as a composite image of the design (e.g., an RGB image). In essence, each layer is a gray level image of the respective color design. In other words, each layer includes the topography associated with the respective color design thereof.

Inspection of designs, printed on a substrate by a printing press, is also known in the art and aims at detecting defects in the printed design. Defects in cylinder printing presses (e.g., rotogravure, flexographic printing press or an offset printing press) may take the form of hickies, voids, pinholes, slurring, mottles and the like. In digital printing presses, defects may be caused by a missing nozzle (i.e., a nozzle that did not print), a deviating nozzle (i.e., a nozzle that printed at a location where it was not intended to print), a redundant nozzle (i.e., a nozzle that printed when it was not intended to print) or an inconsistent nozzle, also referred to as "weak nozzle" (i.e., a nozzle which does not deposit ink at a predetermined rate). The defects may take the form of streaks in the printed image. Inspection is typically performed by acquiring an image of the printed design and comparing this acquired image to a reference image also known as a 'golden master' or 'proof'. Such reference images are usually generated by printing a copy of the composite design after the printing press has been set up and the composite design is judged by a person to be of sufficient quality, and then acquiring an image of the printed design with an imager. The reference image is typically a Red Green and Blue (RGB) image. It is noted that the number of layers does not necessarily correspond to the number of dimensions of the color space employed by the imager (e.g., three in the case of an RGB imager).

SUMMARY OF THE PRESENT DISCLOSED TECHNIQUE

It is an object of the disclosed technique to provide a novel method and system for generating images for inspection. In accordance with the disclosed technique, there is thus provided a method for generating a test set for inspection of a design being printed by a printing press. The printing press includes a plurality of color units, each color unit prints a respective color. The design is composed of a plurality of original layers. Each original layer includes a topography associated with a respective color. Inspection at least includes determining the origin of at least one defect in the printed design. The method includes the procedure of generating at least one defective layer of the design, by introducing at least one selected defect to at least one selected original layer, in at least one selected location. The method further includes the procedure of combining layers using a trained synthesis neural network. The layers include the at least one defective layer and remaining ones of the original layers. The trained synthesis neural network provides at the output thereof a plurality of features respective of each pixel. The method also includes the procedure of generating the test set from the output of the synthesis neural network. The test set includes at least one synthesized test image. The at least one synthesized test image includes at least one synthesized defect at the at least one selected location. The test set is employed to determine the origin of the at least one defect.

BRIEF DESCRIPTION OF THE DRAWINGS

The disclosed technique will be understood and appreciated more fully from the following detailed description taken in conjunction with the drawings in which:

FIGS. 4A and 4B are schematic illustration of a synthesized image and an acquired image respectively, both in accordance with another embodiment of the disclosed technique;

FIG. 6 is a schematic illustration of a synthesized defective image, in accordance with another embodiment of the disclosed technique;

FIG. 10A is a schematic illustration of an exemplary RGB image of a printed design that was printed on a substrate employing a seven color process and FIGS. 10B-10E are schematic illustrations of the separation image, the layer and an image of the color designs printed on the substrate only by the respective color unit, in accordance with another embodiment of the disclosed technique;

FIGS. 12A and 12B are a schematic illustration of an image in which each pixel or group of pixels is associated with a respective layers combination identifier, in accordance with another embodiment of the disclosed technique;

FIG. 15 is a schematic illustration of a method for determining training sets for neural networks in accordance with a further embodiment of the disclosed technique.

DETAILED DESCRIPTION OF THE EMBODIMENTS

The disclosed technique overcomes the disadvantages of the prior art by providing a system for synthesizing images for inspection, for example, of designs printed on a substrate by a printing press. The synthesized image may be employed for various purposes. According to one example, a golden master may be synthesized from the layers from which the design is composed (i.e., instead of printing such a reference image). According to another example, synthesizing an image may be employed to create synthesized defective images, which shall serve as a test set for determining the origin of the defect. The defect introduced into each synthesized image shall be a defect that the printing press has caused or may cause in the printed design. These synthesized defective images shall be employed to determine the origin of the defect by comparing these images with an acquired image of the printed design (i.e., when a defect is detected in the acquired image), and determining which synthesized defective image best matched the acquired image. The number of images employed for determining the origin of the defect may be reduced by decomposing the acquired image into separation images and introducing a defect only to the layers corresponding to the separation images in which a defect in the print was detected, as further elaborated and explained below.

Image Synthesis

Figure 1:
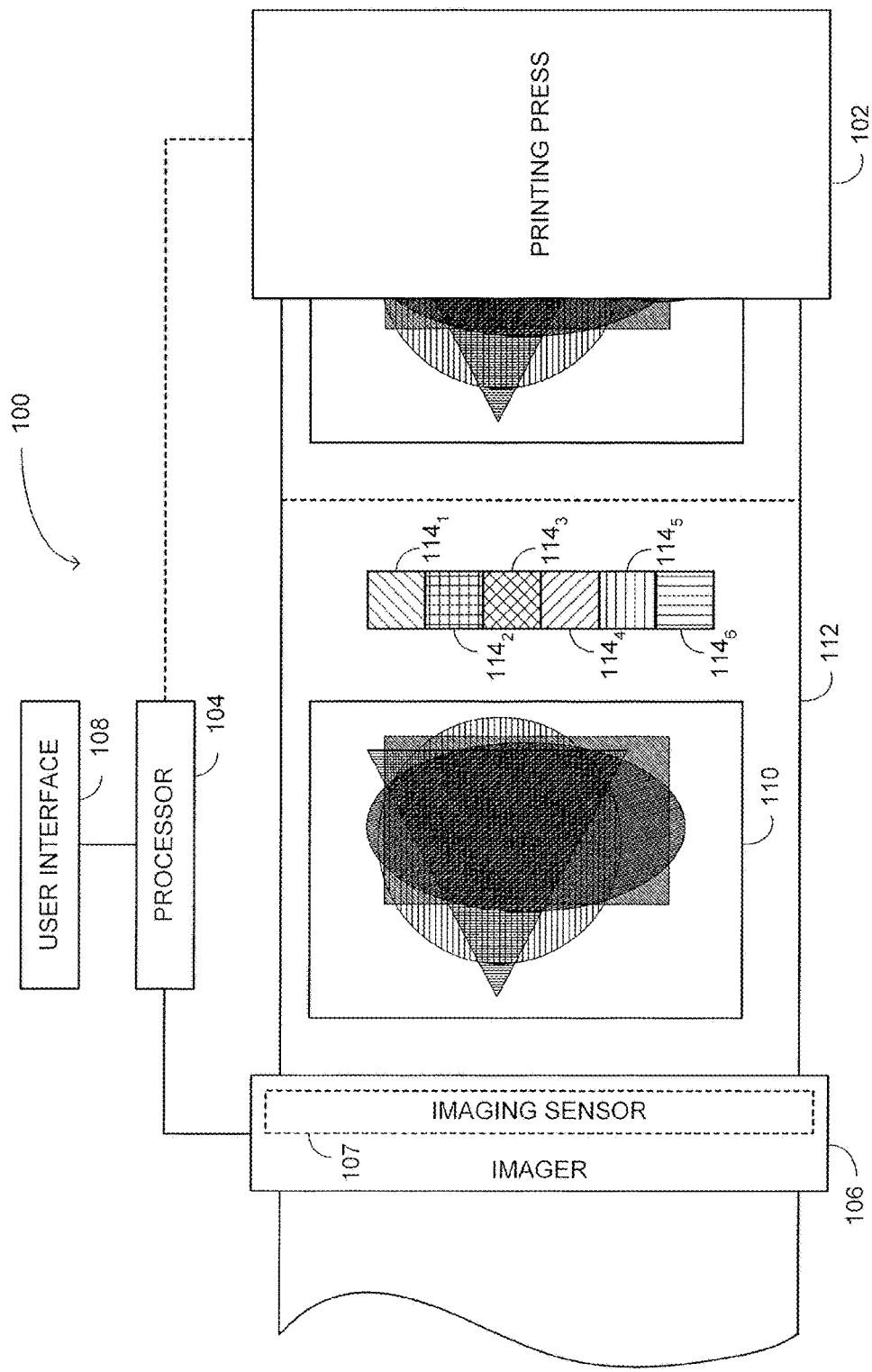
FIG. 1 is a schematic illustration of a printing and inspection system, constructed and operative in accordance with an embodiment of the disclosed technique.

According to one example, an image or images are synthesized employing an Artificial Neural Network (ANN), referred to herein also just as 'neural network'. A neural network employed for synthesizing images is also referred to herein as a 'synthesis neural network'. Prior to describing image synthesis for inspection according to the disclosed technique, a description of a general printing press is presented. Such a printing press can employ image synthesis of the disclosed technique. Reference is now made to FIG. 1, which is a schematic illustration of a printing and inspection system, generally referenced 100, constructed and operative in accordance with an embodiment of the disclosed technique. Printing and inspection system 100 includes a printing press 102 a processor 104, an imager 106 and a user interface 108. Imager 106 further includes an imaging sensor 107. Processor 104 is coupled with imager 106 and with user interface 108. Processor 104 is further optionally coupled with printing press 102 (i.e., as indicated by the dashed line). User interface 108 is, for example, a visual interface (e.g., a display) or audio interface or both able to present a user with information.

Printing press 102 is, for example, a cylinder based printing press (e.g., flexographic printing press, rotogravure printing press or an offset printing press). As such, printing press 102 includes a plurality of printing stations, each printing a respective color and a respective color design. The overlay of the printed color designs on substrate 112 results in the printed composite design. Alternatively, printing press 102 may be a digital printing press. As such, printing press 102 includes a bank of nozzles. The nozzle bank includes an array of nozzles, which includes a plurality of nozzle lines (i.e., along the width of the substrate) each nozzle line includes a plurality of nozzles. Each of at least one nozzle line is associated with a respective color to be printed and prints a respective color design. In other words each color and color design is printed by a respective nozzle line or lines. The term 'nozzle' herein above and below relates to a discrete ink deposition unit depositing ink on a substrate either directly or in-directly (i.e., via an intermediate medium). A Nozzle line or lines or a printing station, which print a respective color is also referred to herein as a 'color unit'.

Prior to printing the design on the substrate, printing press 102 goes through a setup process. Herein, setting up printing press 102 relates to registering the color units and setting the amount of ink deposited on the substrate. In cylinder based printing presses, setup also includes determining the relative working distance between the various cylinders of the printing station (i.e., also referred to as 'pressure setup'). Specifically, in offset printing presses, setup may also relate to determining the ink-water balance. In digital printing presses, setup relates also to color uniformity calibration (i.e., such that all nozzle associated with a respective color shall print the same shade and density of color). Setup results in the composite design being printed at optimized conditions.

After setup and during the production of the print job, printing press 102 prints a design 110 on a substrate 112. Printing press 102 may further print color targets such as color targets $114_1$-$114_6$, generally employed for color control. It is noted that in FIG. 1, color targets $114_1$-$114_6$ are depicted as being printed on the margins of image 110. However, color targets $114_1$-$114_6$ may alternatively be printed in the image or constitute a part of the printed image. In other words, regions within the image may be designated for color control purposes. During the print run, image 112 and color targets $114_1$-$114_6$ pass in front of camera 106 and camera 106 acquires an image or images thereof. Camera 106 provides this image or images to processor 104 for inspection. Processor 104 inspects the acquired image (e.g., by segmenting both the acquired image and the golden master and identifying segments which exist in the acquired image and not in the golden master and optionally classifying these segments). Processor 104 may further provide user interface 108, with information relating to the results of the inspection. User interface 108 presents that information to the user.

Figure 2A:
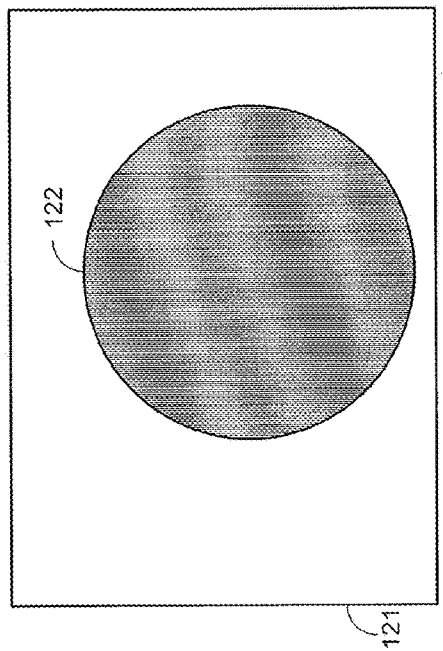
FIGS. 2A-2D are schematic illustrations of layers respective of color designs, which are to be printed on a substrate
Figure 2B:
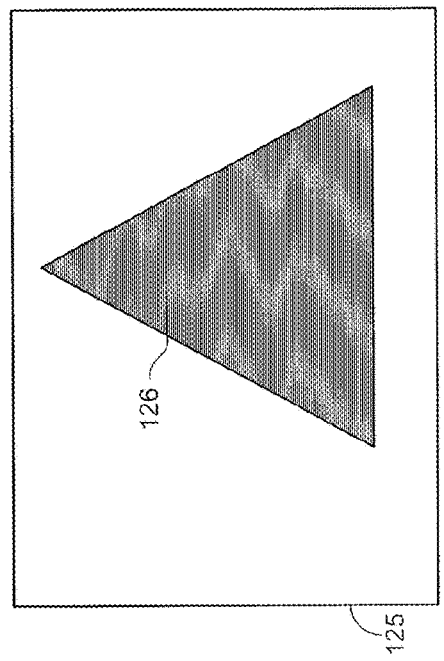
Figure 2C:
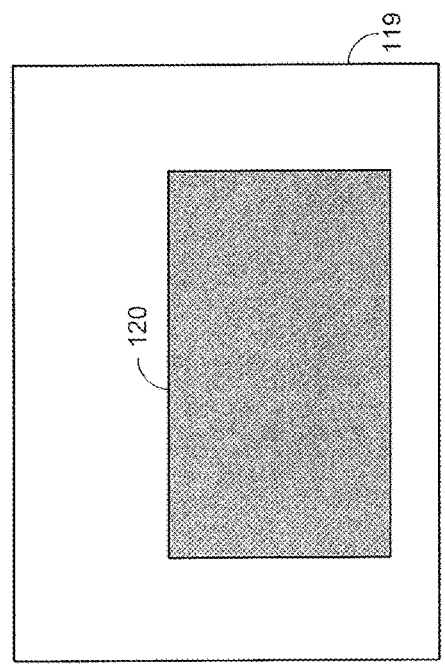
Figure 2D:
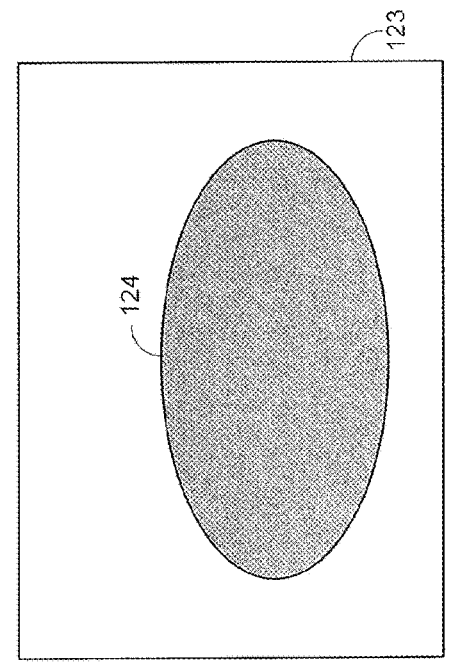
Figure 2E:
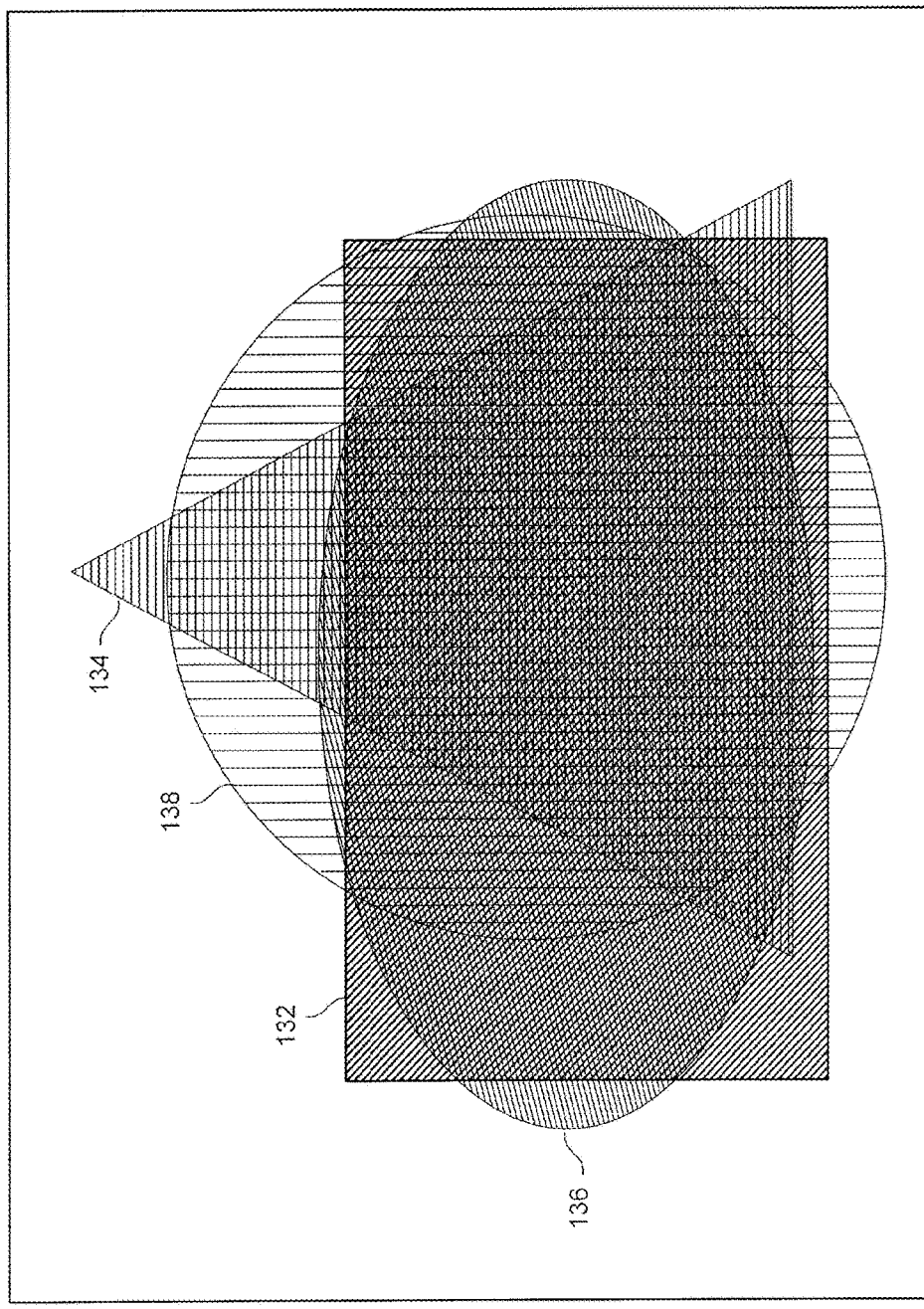
FIG. 2E is a schematic illustration of a printed design, also in accordance with another embodiment of the disclosed technique.

Reference is now made to FIGS. 2A-2E. FIGS. 2A-2D are schematic illustrations of layers 119, 121, 123 and 125 respective of color designs 120, 122, 124 and 126 which are to be printed on a substrate and FIG. 2E is a schematic illustration of a printed design 130, both in accordance with another embodiment of the disclosed technique. Color design 120 (FIG. 2A) exhibits the shape of a rectangle, color design 122 (FIG. 2B) exhibits the shape of a circle, color design 124 (FIG. 2C) exhibits the shape of an ellipse and color design 126 (FIG. 2D) exhibits the shape of a triangle. Each one of printed designs 120, 122, 124 and 126 is associated with a respective color (i.e., as represented by the hatching of each color design). Each one of color design 120, 122, 124 and 126 is printed on a substrate by a respective color unit of a printing press (e.g., printing press 102—FIG. 1).

After the printing press is set up, printing color designs 120, 122, 124 and 126 on the substrate result in a composite design being printed on the substrate. However, printing the design before the printing press setup is complete, may result in a printed composite design with insufficient quality (e.g., as judged by the operator and/or a quality department and/or the end-customer). When setting up a printing press, a golden master may be needed to determine that the composite design being printed is of sufficient quality. However, since the printing press is not set up, the printing press cannot print such a golden master. Also, as mentioned above, the golden master is employed for inspecting the design printed on the substrate during the job production run.

As mentioned above, the layers corresponding to the different color designs may be combined to create a synthesized image, which can be employed as a golden master. Such a golden master may be synthesized using a synthesis neural network. In general, a neural network may be viewed as a computational model formed by a weighted directed graph, in which the nodes, also referred to as neurons or perceptrons, are connected with weighted edges, where a respective computational operation is performed at each node. A neural network may include one or more input nodes, one or more output nodes and one or more hidden layers, each including at least two nodes. According to the disclosed technique, when synthesizing an image, the inputs to the synthesis neural network are the normalized grey level layers corresponding to the color designs of the composite design to be printed. The output of the synthesis neural network is, for example, a synthesized RGB image.

Figure 3A:
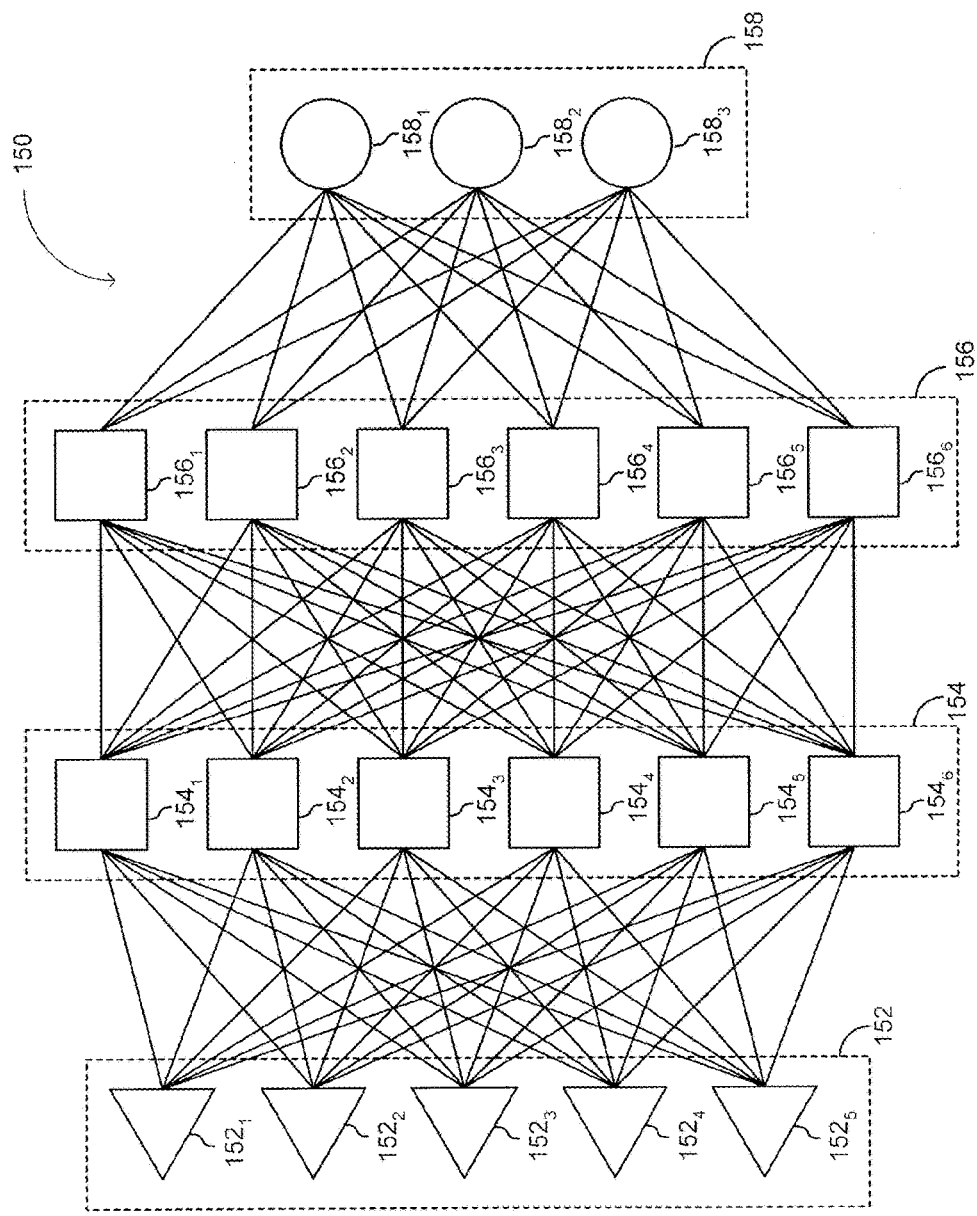
FIG. 3A is a schematic illustration of an exemplary deep learning system and FIG. 3B is a schematic illustration of a single perceptron employed in synthesis neural network of FIG. 3A in accordance with a further embodiment of the disclosed technique.
Figure 3B:
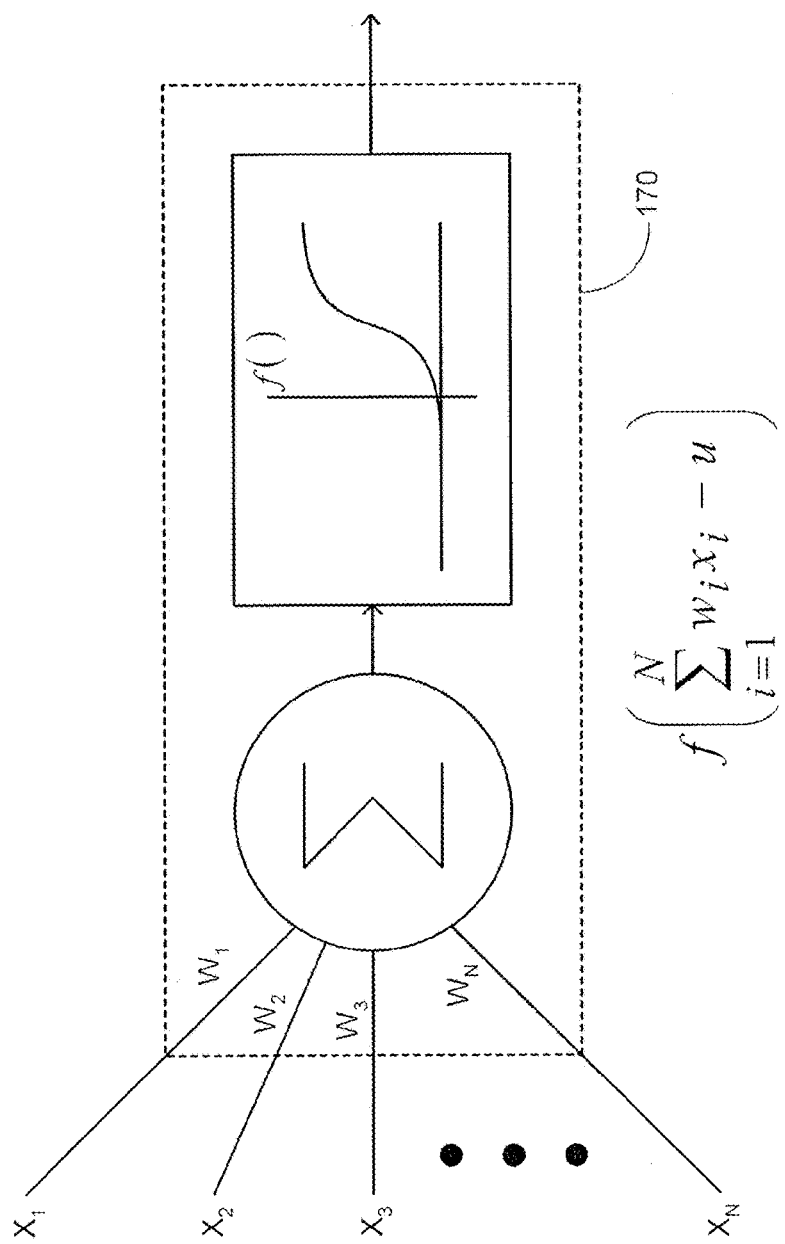

Reference is now made to FIGS. 3A and 3B. FIG. 3A is a schematic illustration of an exemplary deep learning system, generally referenced 150, for synthesizing images. Deep learning system 150 is exemplified as a synthesis neural network. FIG. 3B is a schematic illustration of a single perceptron 170, employed in synthesis neural network 150. Synthesis neural network 150 and perceptron 170 are both constructed and operative in accordance with a further embodiment of the disclosed technique. Synthesis neural network 150 includes an input layer 152, two hidden layers, hidden layer 154 and hidden layer 156 and an output layer 158. Input layer 152 includes five input nodes $152_1$-$152_5$, hidden layer 154 includes six perceptrons $154_1$-$154_6$, hidden layer 156 also includes six perceptrons $156_1$-$156_6$ and output layer includes three perceptrons $158_1$-$158_3$.

In exemplary synthesis neural network 150, each one of input nodes $152_1$-$152_2$ is connected with each one of hidden perceptrons $154_1$-$154_6$. Each one of hidden perceptrons $154_1$-$154_6$ is connected with each one of hidden perceptrons $156_1$-$156_6$. Each one of hidden perceptrons $156_1$-$156_6$ is connected with each one of output perceptrons $158_1$-$158_3$. Each perceptron, such as perceptron 170 (FIG. 3B), performs a respective computation operation as follows:

$$f(\Sigma_{i=1}^{N} w_i x_i + u) \quad (1)$$

where $x_i$ is the $i^{th}$ input into the perceptron, $w_i$ is the weight associated with that the $i^{th}$ input, u is a bias, $\Sigma$ is the summation operation, f( ) is an activation function and N is the number of inputs into the perceptron. In other words, the output of a perceptron is the value of an activation function where the argument of the activation function is a biased weighted sum of the inputs to the perceptron. The activation function may be, for example, a threshold function, a linear function, a Gaussian function or a Sigmoid function. The bias, u, may also be equal to zero (i.e., the argument of the activation function is an un-biased weighted sum of the inputs of the perceptron).

In exemplary synthesis neural network 150, input nodes $152_1$, $152_2$, $152_3$, $152_4$ and $152_5$ receive, for example, five grey level design layers images corresponding to the color designs from which the composite design to be printed is composed. For example, input node $152_1$ corresponds to a cyan layer, input node $152_2$ corresponds to a magenta layer, input node $152_3$ corresponds to a yellow layer and input node $152_4$ corresponds to a "spot color" (e.g., Pantone color such as Pantone 2013U). A spot color herein relates to a color defined by pigments rather than by process color such as RGB, Cyan, Magenta, Yellow and Black (CMYK) or Cyan, Magenta, Yellow, Black Orange, Green and Violet (CMYKOGV). Input node $202_5$ corresponds to the color of the background, referred to herein as 'the background node' on which the design is to be printed (e.g., the color of the substrate). In other words, synthesis neural network 150 includes an input node respective of each color being printed and at least one input node respective of the background. In general, the value of the background node is set to a constant relating to a theoretical pixel value of an acquired image of the background. Typically this constant is set to the maximum pixel value. For example, when pixel values are between 0 and 1, the input node corresponding to the background is set to 1. Assigning a background node enables the synthesis neural network to incorporate the effects of the background (e.g., the substrate) on the appearance of the printed design (i.e., the color of the various layers are referenced to the colors of the background).

In general, the input into the synthesis neural network may be considered as M vectors, where each vector corresponds to a layer and each entry in each vector corresponds to a value of a pixel, which is designated by the x, y grid location of the pixel in the image, as follows:

$$\{g(1,x,y),g(2,x,y),\ldots,g(M,x,y)\} \quad (2)$$

It is noted that the vectors are spatially coherent (i.e., each entry index in each vector corresponds to the same pixel location in each layer). The output of the synthesis neural network is, for example, a vector $h(x, y, f_1, f_2, \ldots, f_k)$ of k features for each pixel (e.g. values corresponding to R, G, B, x derivative for each color, y derivative for each color and the like). In other words, synthesis neural network 150 includes an output node respective of each selected image color feature. Thus, by providing the design layers to the input of synthesis neural network 150, synthesis neural network 150 shall generate an RGB image of the design to be printed. Such an image may be employed as a golden master. It is noted that synthesizing a golden master may be preferable to employing composite image provided with the design file since, as mentioned above and below, a synthesis neural network accounts for the effects of the background and the imager.

Reference is now made to FIGS. 4A and 4B which are schematic illustration of a synthesized image 180 and an acquired image 182 respectively, both in accordance with another embodiment of the disclosed technique. Image 180 is a synthesized image of the design and image 182 is an acquired image (e.g., with imager 106—FIG. 1) of the same design, printed on a substrate. As can be seen, synthesized image 180 and acquired image 182 exhibit a similar quality although close inspection shall reveal that synthesized image 180 exhibits sharper edges.

Figure 5:
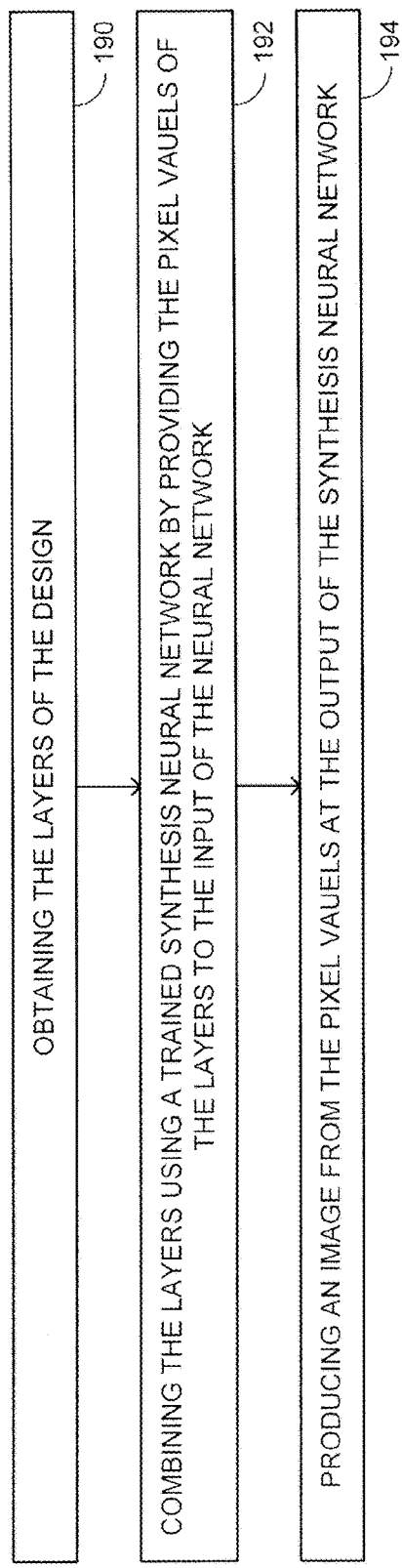
FIG. 5 is a schematic illustration of a method for synthesizing an image for inspection of a printed design being printed by a printing press, in accordance with a further embodiment of the disclosed technique.

Reference is now made to FIG. 5 which is a schematic illustration of a method for synthesizing an image for inspection of a printed design being printed by a printing press, in accordance with a further embodiment of the disclosed technique. In procedure 190, the layers of the design are obtained. These layers are typically obtained from a file (e.g., PDF) and include an image (typically a gray level image) of the respective color design. These layers may also be defective layers as further elaborated below.

In procedure 192, the layers are combined using a trained synthesis neural network. Training a neural network is further elaborated below. As described above, a synthesis neural network receives the values (i.e., typically normalized values) of the pixels of the layers at the input thereof, and produces pixel values of the synthesized image (i.e., either a color image or a monochrome image) at the output.

In procedure 194, a synthesized image is produced form the pixel values at the output the synthesis neural network. As mentioned above, synthesizing images may be employed to synthesize defective images, which shall serve as a test set or sets for determining the origin of the defect. In other words, virtual defects are generated in the synthesized image. The virtual defect generated in each synthesized image shall display characteristics relating to a defect that the printing press may have caused to the printed design (e.g., hickies, voids, pinholes, slurring mottles, streaks). These synthesized defective images (i.e., the synthesized image which include the virtual defects), are analyzed to determine the origin of real defects (i.e., which color unit or units may have caused the defect and a classification of the defect), by comparing these synthesized defective images with an acquired image (i.e., an image acquired with an imager) of the printed design, when a defect is detected in the acquired image. The synthesized defective image, which best matches the acquired image is identified from the test set. The defect and the origin of the defect can be determined according to the synthesized defective image which is identified as matching the acquired image. Matching image may be achieved, for example, by determining the correlation between the two images. The images, with a correlation or similarity score above a predetermined value, are determined as matching.

Following is an example relating to synthesizing a defective image and determining the cause of the defect. The example employs a streak in the image which was caused by a missing nozzle in a digital printing press. Referring back to FIG. 1, printing press 102 prints a design on substrate 112. Imager 106 acquires an image of the printed design. The printed design includes a defect such as a streak. Processor 106 analyzes the acquired image and determines that that a streak is present. Processor 106 then generates a test set to determine the origin of the defect. Reference is now made to FIG. 6, which is a schematic illustration of a synthesized defective image, generally referenced 200, in accordance with another embodiment of the disclosed technique. Image 200 is an image of a printed design which includes four color designs of a rectangle 202, a triangle 204, an ellipse 206 and a circle 208, each printed in a respective color (i.e., as represented by the hatching of each color design in FIG. 4). The color design depicted in FIG. 4 includes a defect such as a streak 210. Continuing with the streak example, typically, streaks are caused in digital printing press when one or more nozzles does not print (i.e., a missing nozzle) or do not deposit the expected amount of ink (i.e., weak nozzle). However, in general, the number of pixel sensors in imaging sensor 107, may be smaller than the number of nozzles in each nozzle line (i.e., the resolution of the imager is smaller than the resolution of the digital printing press). Therefore, each pixel is associated with more than one nozzle, and thus, it may not be possible to determine from the acquired image of the printed design, which nozzle or nozzles (i.e., the exact location and the color of the nozzle) caused the streak, without additional processing.

Figure 7A:
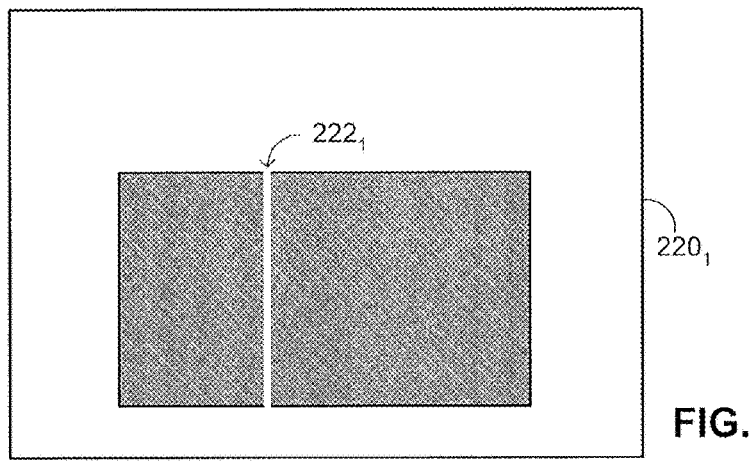
FIGS. 7A-7L are schematic illustrations of synthesized defective layers, in accordance with a further embodiment of the disclosed technique.
Figure 7B:
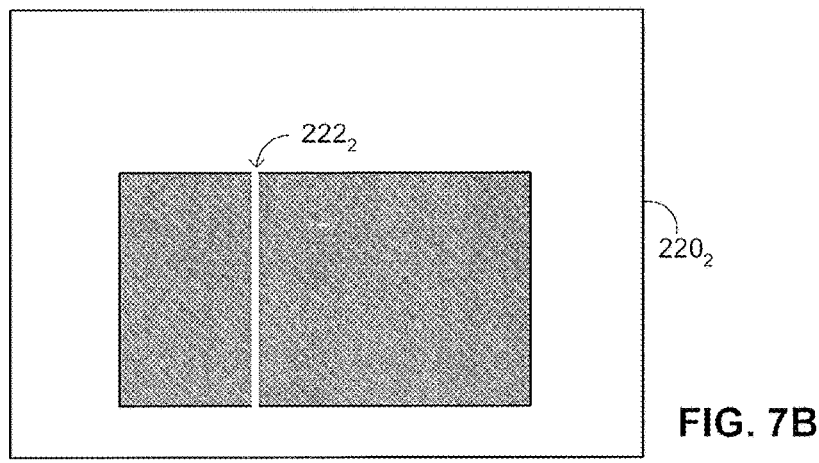
Figure 7C:
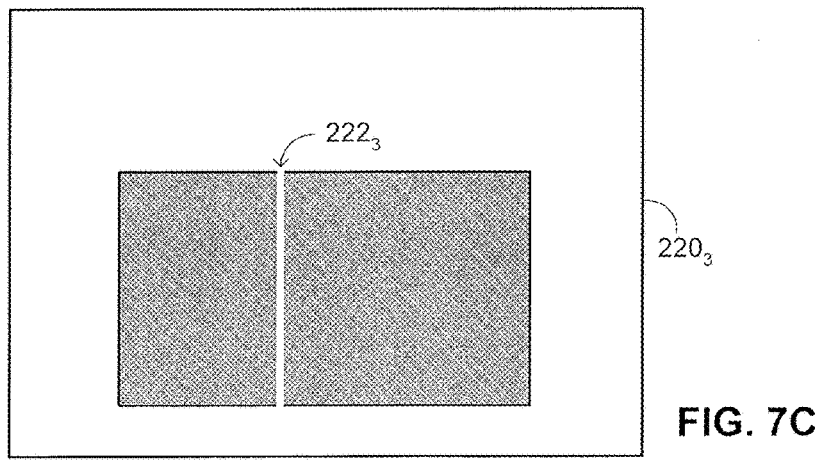
Figure 7D:
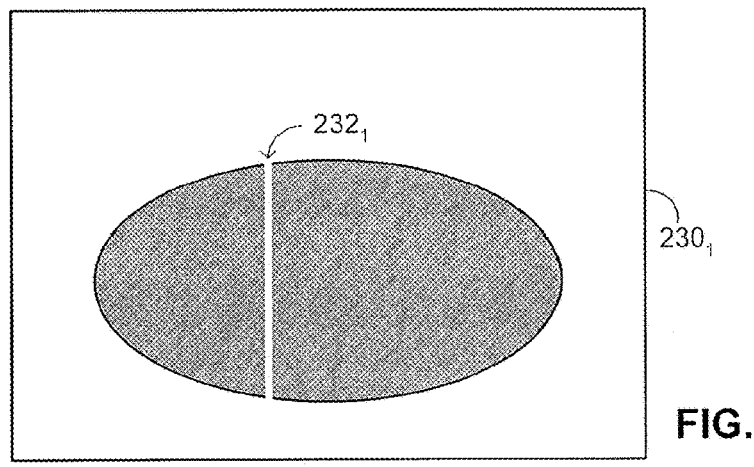
Figure 7E:
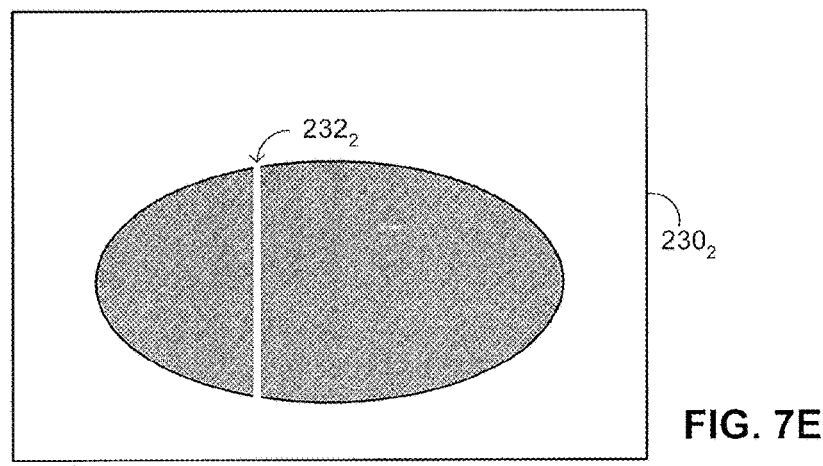
Figure 7F:
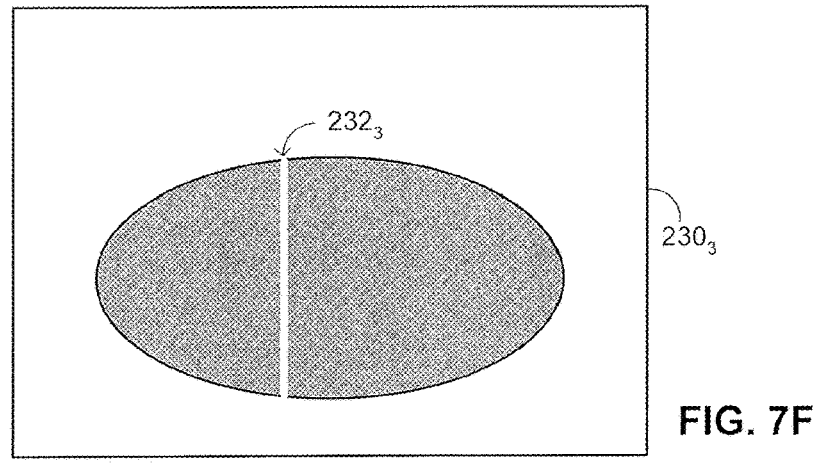
Figure 7G:
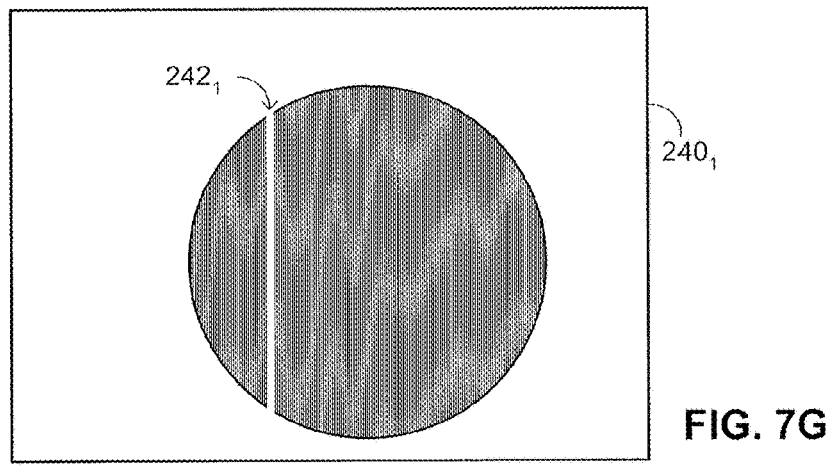
Figure 7H:
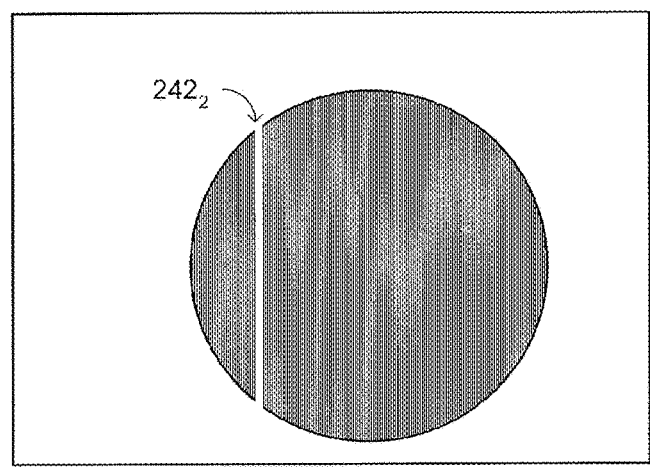
Figure 7I:
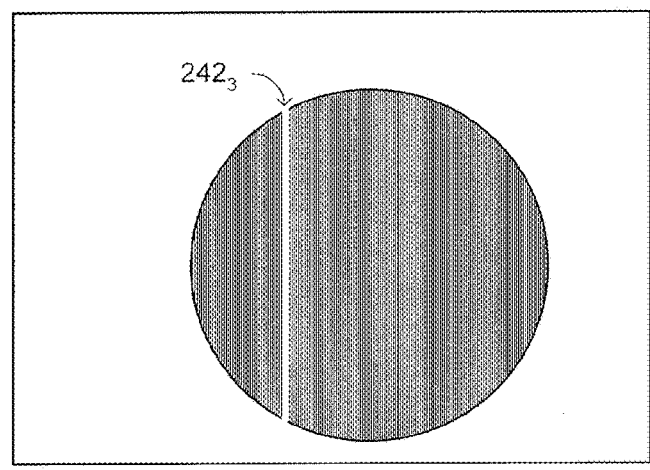
Figure 7J:
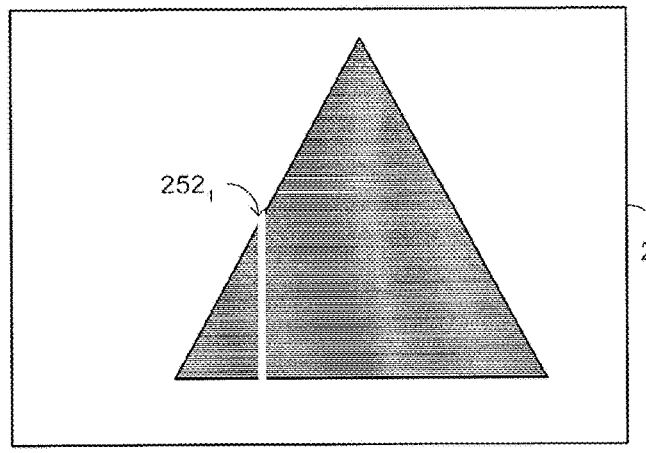
Figure 7K:
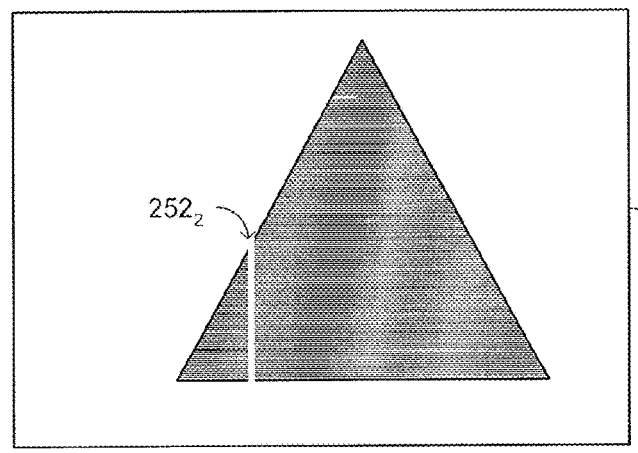
Figure 7L:
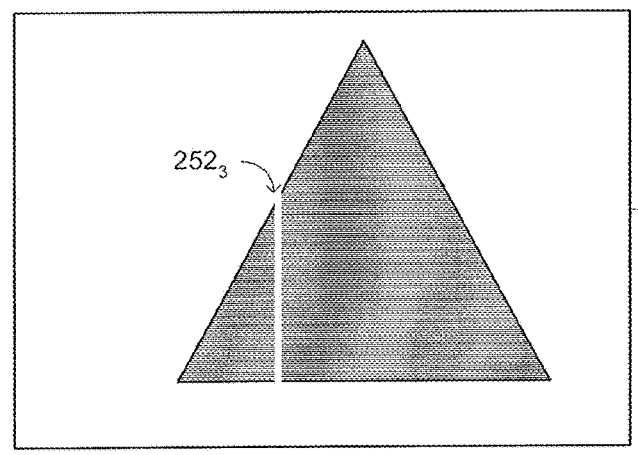

Still referring to FIG. 6, to identify the nozzle or nozzles which caused streak 210, a set of synthesized defective images are generated, where each image in the set, includes a synthesized streak. A synthesized defective image is referred to herein as a 'test image' or a 'synthesized test image' and a set of test images is referred to herein as a 'test set'. A synthesized test image is generated by introducing a defect associated with a selected type of malfunction (e.g., missing nozzle, weak nozzle) to selected individual layers at selected locations (i.e., generating a defective layer). Accordingly, when the detected defect is a streak such as streak 160, each defective layer is associated with a respective malfunctioning nozzle or nozzles (i.e., corresponding to the location of the streak) and optionally with a type of malfunction. A defective image, such as image 150, is synthesized from these defective layers and optionally from the original layers also. Thus, each test image is associated with a respective malfunctioning nozzle or nozzles. In general, the test set is determined by synthesizing selected defects on selected layers at a selected location or locations and synthesizing a defective image employing these defective layers and optionally from the original layers also. Thus, each test image is associated with a selected synthesized defect in a selected layer at a selected location. Reference is now made to FIGS. 7A-7L, which are schematic illustrations of synthesized defective layers, in accordance with a further embodiment of the disclosed technique and also referring back to FIGS. 1 and 6. In the example brought forth in FIGS. 7A-7L, a streak was introduced at different locations corresponding to possible locations of a missing nozzle. With reference to FIGS. 7A-7C, depicted therein are three defective layers $220_1$, $220_2$ and $220_3$, corresponding to rectangle 202 (FIG. 6) with respective streaks $222_1$, $222_2$ and $222_3$ introduced thereto at three different locations. With reference to FIGS. 7D-7F, depicted therein are three defective layers $230_1$, $230_2$ and $230_3$, corresponding to ellipse 206 with respective streaks $232_1$, $232_2$ and $232_3$ introduced thereto at three different locations. With reference to FIGS. 7G-7I, depicted therein are three defective layers $240_1$, $240_2$ and $240_3$ corresponding to circle 208 with respective streaks $242_1$, $242_2$ and $242_3$ introduced thereto at three different locations. With reference to FIGS. 7J-7L, depicted therein are three defective layers $250_1$, $250_2$ and $250_3$ corresponding to triangle 204 with respective streaks $252_1$, $252_2$ and $252_3$ introduced thereto at three different locations.

To determined which nozzle is missing, for each of the color sub-designs processor 104 (FIG. 1) selects either a defective layer or layers or an original layer (i.e., the non-defective layer as received, for example, with the PDF file). Processor 104 employs a neural network, such as synthesis neural network 150 (FIG. 3A) to synthesize a set of defective images (i.e., a set of test images) from the selected layers. Each test image is associated with a respective missing nozzle (i.e., the location and the color of the missing nozzle) or nozzles. Processor 104 compares each test image in the test set with the acquired image of the printed design, for example, by correlating at least a selected portion of the acquired image (i.e., Region Of Interest—ROI) with the corresponding portion in the test image. The missing nozzle or nozzles, corresponding to the test image that best matched the acquired image (e.g., the test image with the highest correlation/similarity score) is identified as the missing nozzle. It is noted that, in general, more than one defect may be introduced to each layer. Typically, when the separation between the defects exceeds the resolution of the imager, a test image with more than one defect may be generated.

Figure 8:
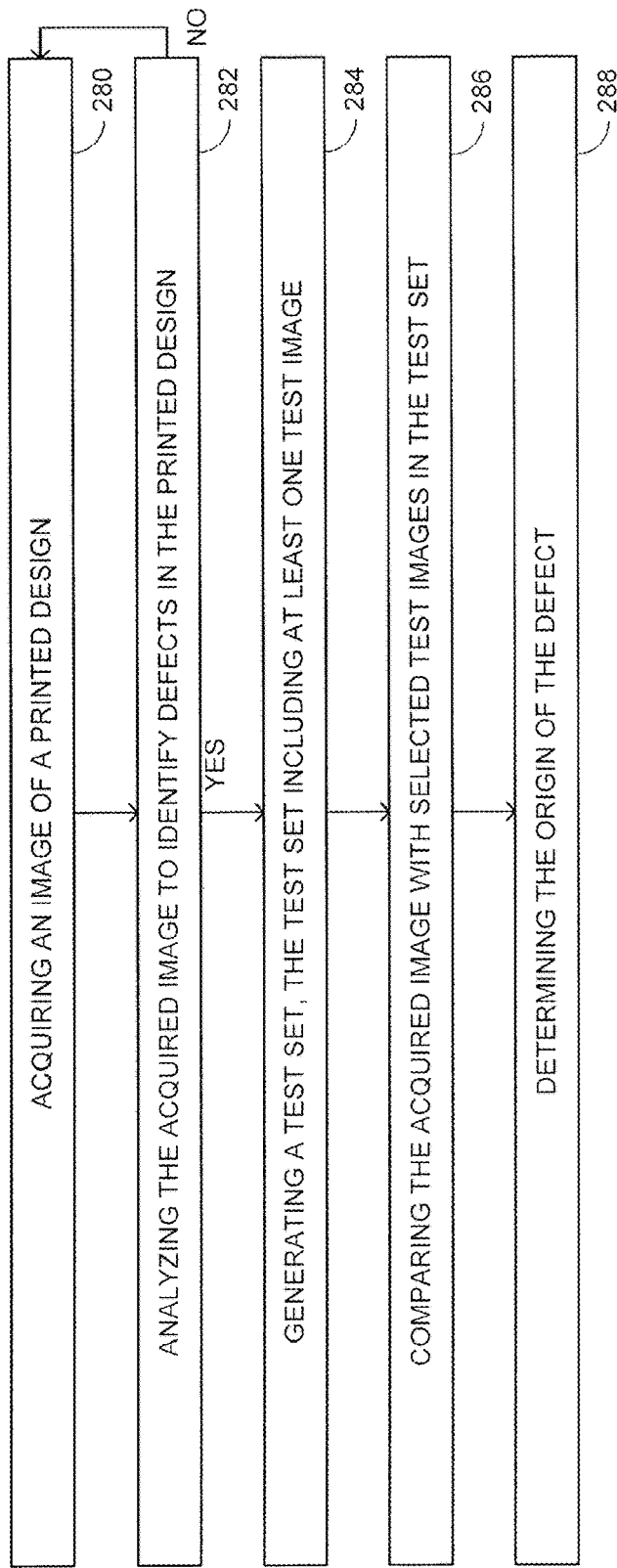
FIG. 8 is a schematic illustration of a method for identifying the origin of defects in a printing press, operative in accordance with another embodiment of the disclosed technique.

Reference is now made to FIG. 8, which is a schematic illustration of a method for identifying the origin of defects in a printing press, operative in accordance with another embodiment of the disclosed technique. In procedure 280, an image of the printed design is acquired. The printed design may include a defect. In digital printing presses the defect may take the form of streaks which may be caused by missing nozzles, redundant nozzles, deviated nozzles or weak nozzles. In cylinder based printing press, the defect may take the form of hickies, voids, slurs, smears, misalignment and the like which may be caused by dirt on the printing plate, improper printing pressure, non-registered color unit ink viscosity, ink drying speed and the like. With reference to FIG. 1, imager 106 acquires an image of the printed design and provides the acquired image to processor 104.

In procedure 282, the acquired image is analyzed to identify defects in the printed design. For example, the acquired image and the golden master are segmented. Thereafter, segments which exist in the acquired image and not in the golden master are identified. Identifying a defect may also include classifying the defect (e.g., by classifying the segment corresponding to the defect). With reference to FIG. 1, processor 104 identifies a defect in the acquired image. When a defect is identified the method proceeds to procedure 284. When a defect is not identified the method returns to procedure 280.

In procedure 284, a test set is generated. The test set includes at least one synthesized test image. The synthesized test image or images include at least one synthesized defect. A test image is generated by introducing a selected defect or defects to selected layers at a selected location or locations and synthesizing the test image, for example, by employing a deep learning system such as a trained synthesis neural network, as described above in conjunction with FIG. 5. Thus, each test image is associated with at least one defect in a selected layer or layers at a selected location or locations. The at least one defect, the layer or layers and the locations are selected from the results of the analysis of the acquired image. A test set is determined by generating a plurality of different test images. In other words, a plurality of defective layers is generated for each color design. Each defective layer is generated by introducing a selected defect or defects at a selected location or locations at the layer corresponding to the color design. Each test image is generated by selecting at least one defective layer and optionally an original layer (i.e., the non-defective layer as received, for example, with the PDF file) and synthesizing an image from these selected layers. Thus, each test image in the test set is associated with a defect or defects (i.e., the location or locations and the color or colors). With reference to FIGS. 1 and 2A, processor 104 (FIG. 1) determines a test set by synthesizing a set of defective images, for example, by employing deep learning system such as synthesis neural network 150 (FIG. 3A).

In procedure 286, the acquired image is compared with selected test images in the test set. The test images are selected, for example, by a user judging a test image as obviously not matching the acquired image, thus reducing the number of images to be compared. The acquired image is compared with the selected test images, for example, by correlating the acquired image or an ROI in the acquired image (e.g., only the region in which the defect is located), with a corresponding ROI in the selected test images. With reference to FIG. 1, processor 104 compares the acquired image with selected test images.

In procedure 288, the origin of the defect is determined. Determining the origin of a defect includes determining the color unit or units which caused the defect and classifying the defect. The origin of the defect is determined by identifying the test image that best matched the acquired image (e.g., according to the score of a correlation). Since each test image in the test set was generated with a synthesized defect or defects in at least one of the layers, each test image is associated with a color unit or units which caused the respective synthesized defect or defects therein. In digital printing press, each test image is further associated with the nozzle or nozzles which caused the defect. Thus, color units and the type of the synthesized defect, corresponding to the test image that best matched the acquired image are determined (i.e., the defect is identified). With reference to FIG. 1, processor 104 identifies the defect.

In general, there can be more than one synthesized image that matched the acquired image. In such a case, it may be required that the printing press shall print each of the colors corresponding to each defective layer in the synthesized images separately, and an image of these printed layers is acquired and analyzed. At the worst case, each layer is printed and analyzed individually. The probability that there is more than one synthesized image that matches the acquired image increases when the acquired image is a monochrome image and moreover when the synthesized images are monochrome images as well (i.e., increases relative to the probability when the images are color images).

As mentioned above, a test image in a test set is generated by introducing a selected defect or defects to selected layers at a selected location or locations and synthesizing the test image. However, when there is no information relating to the color unit or units which caused the defect, then the test set should include test images generated from all the combinations of defective and original layers. In general, the number of test images generated for each selected location is given:

$$\text{test images} = \text{number of locations} * 2^{number\ of\ color\ units} \quad (3)$$

For example, in a four-color process (e.g. CMYK), 16 images (i.e., $2^4$ since the background is considered as a constant input to the network) shall be generated for each defect location. When four locations are selected the test set includes 64 different images. In a seven color process (e.g. CMYKOGV), 128 images shall be generated for each defect location. When four locations are selected, the test set shall include 512 different images. Accordingly, the computational complexity (e.g., measured in the number of operations performed) of comparing the acquired image with the images in the test set increases as the number of color units employed by the printing press increases. To reduce the computation complexity, as mentioned above, only a portion of the total possible number of test images can be employed, as further explained below.

Image Decomposition

According to the disclosed technique, deep learning systems such as neural networks may be employed to determine which color unit or units caused the defect, according to the acquired image of the defective printed design. Such a neural network receives the acquired image as an input and provides image representations (also referred to herein as 'separation images' or just 'separations') of the color designs which each color unit printed on the substrate. In other words, the neural network separates or decomposes the acquired image into images of the printed color designs which compose the printed design. A neural network which separates an acquired image into separation images is referred to herein as a 'separation neural network'. A separation neural network may be employed to reduce the number of images in the above-mentioned test set. Accordingly, when a defect is identified in the printed composite design, an acquired image of the defective printed composite design is decomposed by employing a separation neural network. The separation neural network generates separations images of the different color designs (i.e., images of the different printed layers) and defects are identified in these separation images. Thereafter, defective layers are generated with defects at selected locations for only those colors in which a defect or defects were identified in respective separation image. A defective test image is then synthesized from these defective layers and the remaining original layers. For example, in a CMYK process, defects are identified only in the cyan and yellow separation images. Therefore, selected defects are introduced at selected locations only in the cyan and yellow layers, while the magenta and black layers remain unchanged. A defective test image is then synthesized from the synthesized defective cyan and yellow layers and the original magenta and black layers.

Figure 9:
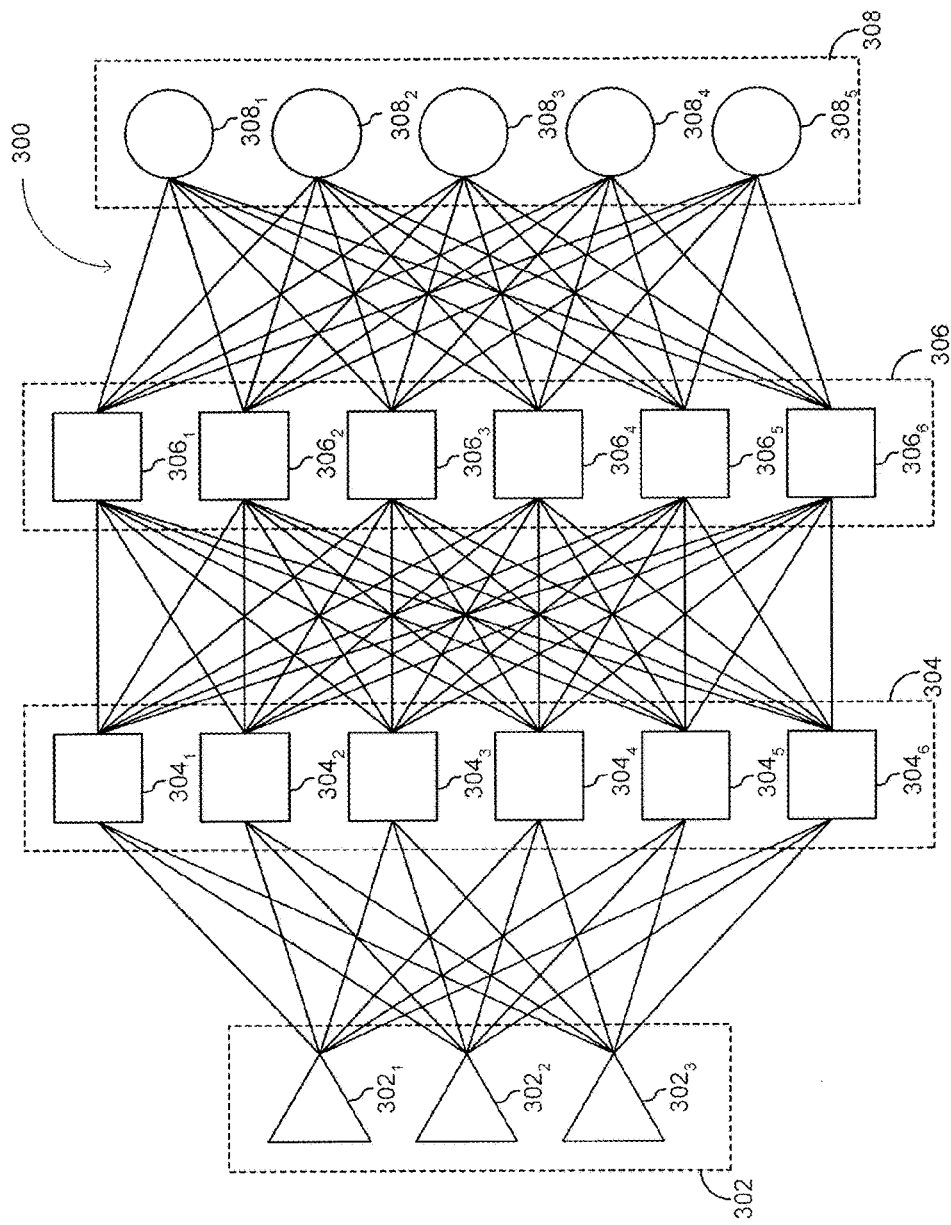
FIG. 9 is a schematic illustration of an exemplary separation neural network constructed and operative in accordance with a further embodiment of the disclosed technique.

Reference is now made to FIG. 9, which is a schematic illustration of an exemplary separation neural network, generally referenced 300 constructed and operative in accordance with a further embodiment of the disclosed technique and referring also to FIG. 1. Separation neural network 300 includes an input layer 302, two hidden layers, hidden layer 304 and hidden layer 306 and an output layer 308. Input layer 302 includes three input nodes $302_1$-$302_3$, hidden layer 304 includes six perceptrons $304_1$-$304_6$, hidden layer 306 also includes six perceptrons $306_1$-$306_6$ and output layer includes five perceptrons $308_1$-$308_5$.

In exemplary separation neural network 300, input nodes $302_1$, $302_2$, $302_3$, receive, for example, three image vectors, corresponding to colors produced by imager 106. For example, when imager 106 is and RGB imager, then, each of input nodes $302_1$, $302_2$, $302_3$ receives a respective one of the color images (e.g., input node $302_1$ receives the red image, input node $302_2$ receives the green image and input node $302_3$ receives the blue image).

In general, the input into the separation neural network may be considered as N vectors, where each vector corresponds to an image color feature (e.g., an Red vector, a Green vector and a Blue vector for an RGB imager, x derivative for each color, y derivative for each color and the like) and each entry in each vector corresponds to a feature value of a pixel, which is designated by the x, y grid location of the pixel in the image as follows:

$$\{c(1,x,y), c(2,x,y), \ldots, c(N,x,y)\} \quad (2)$$

It is noted that the vectors are spatially coherent (i.e., each entry index in each vector corresponds to the same pixel location in each layer). For each pixel, the output of the separation neural network is for example a vector $l(x, y, f_1, f_2, \ldots, f_i)$ of i features (e.g. values corresponding to colors of the image representations of the different printed color designs). Thus, by providing the image acquired by imager 106 to the input of separation neural network 300, separation neural network 300 shall generated representation images of the color designs from which the printed design in composed.

Figure 10A:
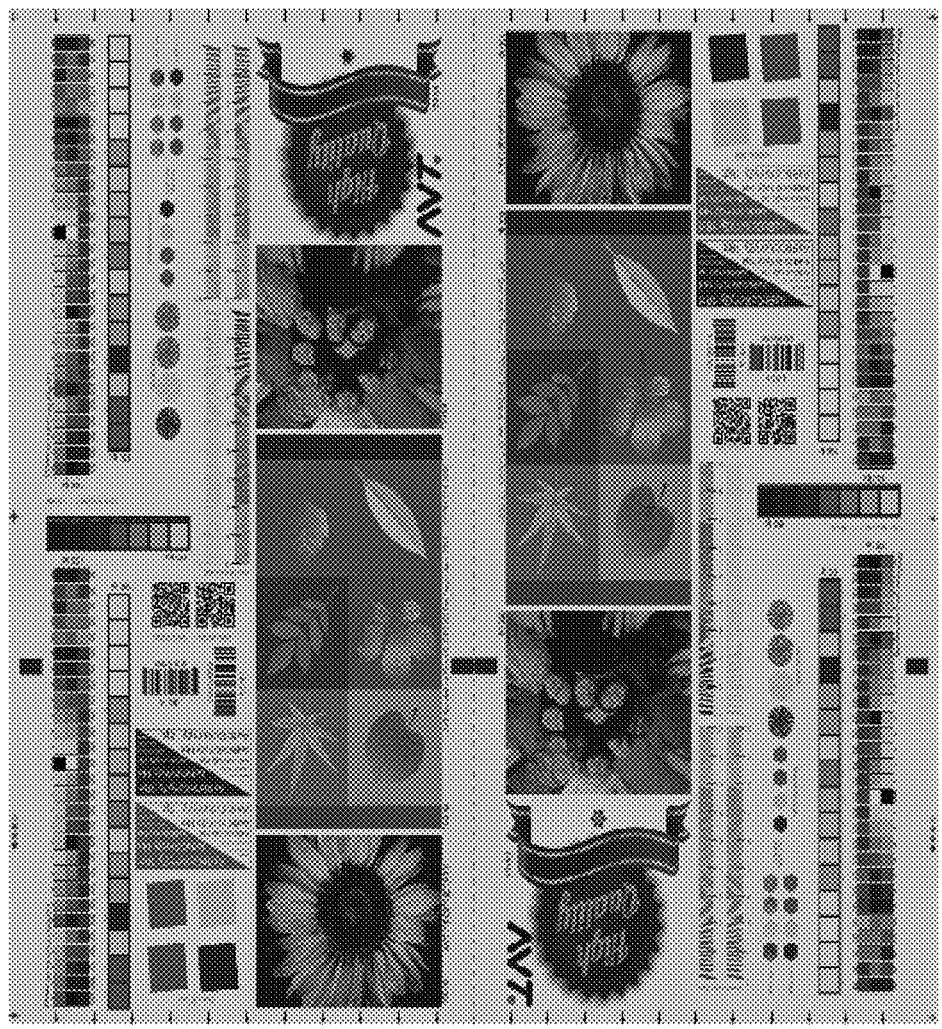

Reference is now made to FIGS. 10A-10E. FIG. 10A is a schematic illustration of an exemplary RGB image of a printed design that was printed on a substrate employing a four color process and FIGS. 10B-10E is schematic illustration of the separation image (referred to as 'separation' in FIGS. 10B-10E), the layer (e.g., from the PDF file) and an image of the color designs printed on the substrate only by the respective color unit (referred to a 'single deck' in FIGS. 10B-10E) in accordance with another embodiment of the disclosed technique. In the example brought forth in FIGS. 10A-10E, a CMYK printing process is employed. FIG. 10B depicts the layer, the separation and an image of the printed color design corresponding to Cyan. FIG. 10O depicts the layer separation and an image of the printed design corresponding to magenta. FIG. 10D depicts the layer separation and an image of the printed design corresponding to yellow. FIG. 10E depicts the layer separation and an image of the printed design corresponding to black. As mentioned above, the separation image or images, which include a defect can be identified. Accordingly, the color unit or units that caused the defect can be determined. By generating a defective layer or layers for only those colors and synthesizing a defective image from these defective layers and the remaining original layers, the number of test images in the test set is reduced.

Figure 11:
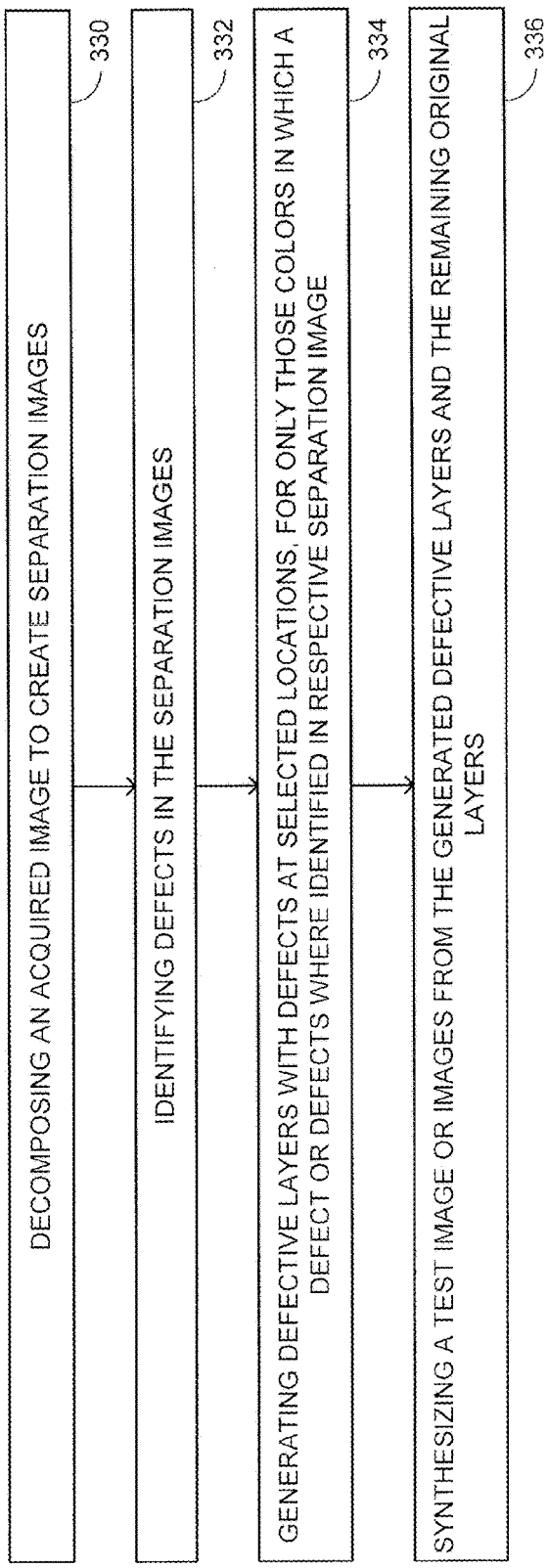
FIG. 11 is a schematic illustration of a method for determining a test set, when a defect was identified in an acquired mage of the printed design, in accordance with a further embodiment of the disclosed technique.

Reference is now made to FIG. 11 which is a schematic illustration of a method for determining a test set, when a defect was identified in an acquired mage of the composite printed design, in accordance with a further embodiment of the disclosed technique. In procedure 330, an acquired image is decomposed to create separation images. The acquired image is decomposed by employing a deep learning system such as a trained separation neural network. With reference to FIGS. 1, 9 and 10A-10E, processor 104 decomposes an acquired image into separation images employing separation neural network 300.

In procedure 332, defects are identified in the separation images. Identifying a defect includes identifying the location of the defect in the acquired image as well as classifying the defect (e.g., missing nozzle or weak nozzle in digital printing press or hickies, voids, pinholes, slurring or mottles in cylinder based printing presses). In other words, the location and the type of the defect are identified. With reference to FIG. 1, processor 104 identifies defects in the decomposed layers.

In procedure 334, defective layers are generated with selected defects at selected locations (i.e., according to the identified defects) for only those colors in which a defect or defects were identified in respective separation image. With reference to FIG. 1, processor 104 generates defective layers.

In procedure 336, a test image or images are synthesized from the generated defective layers and the remaining original layers. With reference to FIGS. 1 and 3A, processor 104 synthesizes a test image or images from the generated defective layers employing synthesis neural network 150.

It is noted that procedures 330, 332 and 334 described herein are an example of obtaining layers of the design described herein above in conjunction with FIG. 5. Procedure 336 is an example of combining layers and producing an image also described hereinabove in conjunction with FIG. 5.

As mentioned above, a separation neural network may be employed to determine which color unit or units caused a defect, by analyzing the acquired image of the defective printed design. It is noted that a separation neural network may also be employed for setting up a printing press. For example, in a cylinder based printing press, a separation neural network may be employed for determining the relative working distance (i.e., pressured) between the various cylinders of the printing stations as well as to register the printing stations. In such a case, for example in flexographic printing presses and referring back to FIG. 1, processor 104 instructs printing press 102 to vary the anilox pressure and the impression pressure of all the printing stations through a range of distances, while all the printing stations print their respective color designs. Imager 106 acquires an image of the printed composite design, for each set of printing stations distances and provides the image to processor 104. Processor 104 determines separation images respective of each of the printing stations employing a separation neural. The separation images are analyzed in order to determine the minimum pressure setting (i.e., maximum distance between the rollers), in which each separation image exhibits, for example, a predetermined coverage ratio. The term 'coverage ratio' relates, for example, to the ratio between the area of each printed color design on the web (i.e., as determined from the separation image) to the area of the respective layer (e.g., as determined according to a pixel count). By printing all the color designs and acquiring an image of the printed composite design, the waste involved in setting up a printing press may be reduced.

When registering the printing stations, all station of printing press 102 print their respective color design. Imager 106 acquires an image of the printed composite design and provides the image to processor 104. Processor 104 determines separation images respective of each of the printing stations employing a separation neural network and determines the relative displacement between the separation images. This relative displacement is related to the registration errors between the printing stations.

Color Trending

Separating an acquired image of the printed design into the separation images can also be employed for monitoring color trends in the printed press. Color trends relate to the phenomena that the characteristics of the color deposited on the substrate by each color unit changes with time. Thus, the color of the printed design may be different for each instance of the printed design. By determining the separation images of each acquired image of each instance of a printed design (i.e., the printed designs need not be the same), the color printed by each color unit can be determined and the change in the color printed by each color unit can be also determined relative to a previous instance of the printed design. In other words, separating an acquired image of the printed design into the separation images can also be employed for monitoring the color printed by selected printing units over time.

Training

As mentioned above, deep learning systems such as neural networks may be employed to determine golden masters and test images as well as to determine separation images. Nevertheless, prior to employing a neural network, the weights of the edges and the parameters of the activation function need to be determined. This process is known as "training the network".

Typically, training a neural network includes providing the network with an input, for which the expected output is known, and determining the error between the expected output and the actual output. During training, the weights and parameters of the neural network are updated such that this error is minimized. Minimizing the error between the input and the expected output may be implemented employing optimization methods such as stochastic gradient descent, Broyden, Fletcher, Goldfarb and Shanno (BFGS) algorithm, conjugate gradient and the like. For example, according to a gradient descent process, the corrections to the weights and parameters are determined according to partial derivatives of the error relative to weights and parameters of the neural network (since the neural network may be considered as a composite function). This process is repeated over a plurality of iterations, either for a pre-determined number of iterations or until the error is below a pre-determined value. Furthermore, employing the chain rule, only the input to a layer, the output of the layer and the derivative of the output with respect to the error are required to determine the derivatives of the weights and parameters of that layer.

A change in the job specifications may entail retraining the network. The term 'job specifications' relates to the parameters relating to that job and include, for example, type of ink, density of ink, type of illumination, type and color of substrate, number of printing stations and the like.

When training a synthesis neural network to synthesize an image, the input is a vector or vectors of values, corresponding to respective pixel or pixels at the same relative location in the different layers employed for training. The expected output is an image of the corresponding location. This image may be an acquired image of the printed design or a previously determined image such as the RGB image provided with the PDF. It is noted that when training a synthesis neural network employing an acquired image of the printed design, the printing press need not be registered, only the regions employed for training need to be registered or unaffected by the registration errors (i.e., when such exist), as further explained below.

When training a separation neural network to determine separation images, the input is an image of a selected location (i.e., similar to the expected output when training a synthesis neural network) and the expected output is a vector or vectors of values corresponding to a respective pixel or pixels at a location corresponding to the location in the image. In other words, the input and the expected output employed for training a separation neural network is reversed relative to the input and the expected output employed for training the synthesis neural network.

It is noted that the image or images of the selected locations and the corresponding vector or vectors of values corresponding to respective pixels need not be that of the design to be printed. Color patches, typically employed for color control may also be employed. Furthermore, in general, when training a separation neural network or a synthesis neural network, the input and expected output need not be images. A spectral measurement (e.g., acquired by a spectrophotometer) of the color of the composite printed design may be employed instead of the image. Correspondingly, the vector or vectors of values may be composed of spectral measurements of the color patches employed for color control. Density values (e.g., acquired by a densitometer) may also be employed.

In general, not all the layers, nor the entirety of each layer are required for training (i.e., of either for image synthesis or image separation). Selected regions, referred to herein as 'training regions of interest' or 'training ROIs' in the composite design to be printed, exhibiting selected layers combinations are sufficient, as long as registration errors would not affect the selected region (e.g., the width and length of the region would be much larger than the maximum registration error of the printing press). The selected layer combinations may only be those combinations which are included in the design. Such regions may be selected manually (e.g., by the operator of the printing press) or automatically as explained below and in conjunction with FIGS. 12A, 12B and 13.

Initially, when selecting training regions of interest automatically, a training mask is determined which defines the regions of interest in an image from which a training set or sets are determined. To that end, each pixel, or group of adjacent pixels are assigned a layer combination identifier. The layer combination identifier is associated with the layers associated with that pixel. Table 1 below exhibits an example of the association between the colors of the layers and respective layer combination identifiers. In table 1, the layers combination identifier is a binary number where each digit in this binary number is associated with a layer. The binary digit 1 indicates that the presence of the layer in the respective pixel location, while the binary digit 0 indicates that the layer is not present (i.e., absent) in the respective pixel location. In table 1, the exemplary colors are of the layers the CMYK process colors.

TABLE 1

| Layer Combination | Identifier |
| --- | --- |
| Background | 0000 |
| K | 0001 |
| Y | 0010 |
| YK | 0011 |
| M | 0100 |
| MK | 0101 |
| MY | 0110 |
| MYK | 0111 |
| C | 1000 |
| CK | 1001 |
| CY | 1010 |
| CYK | 1011 |
| CM | 1100 |
| CMK | 1101 |
| CMY | 1110 |
| CMYK | 1111 |

Figure 12A:
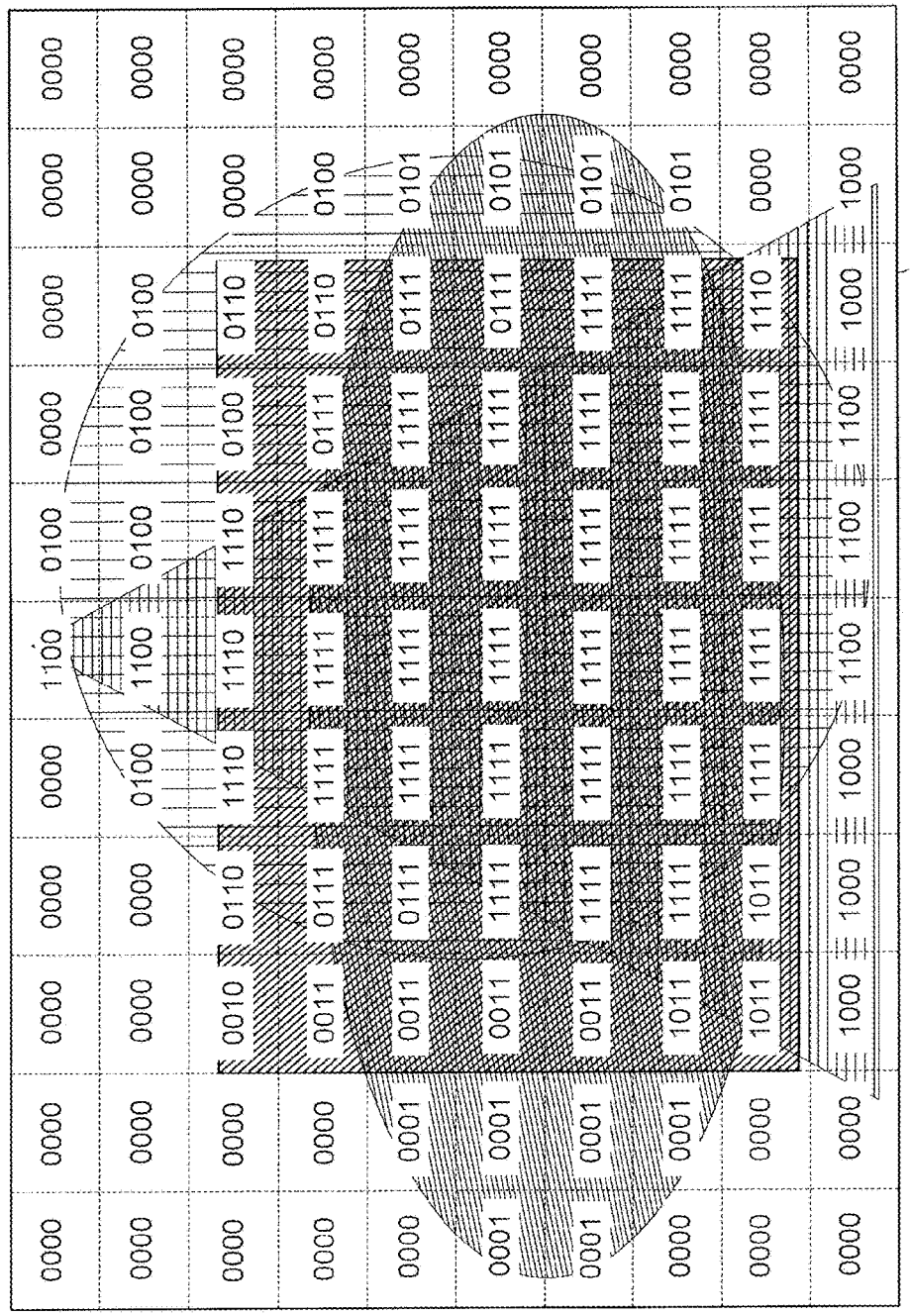

Reference is now made to FIGS. 12A and 12B, which are a schematic illustration of an image, generally referenced 350, in which each pixel or group of pixels is associated with a respective layers combination identifier, in accordance with another embodiment of the disclosed technique. FIG. 12A depicts image 350 with the layers overlaid thereon and FIG. 12B depicts image 350 without the layers overlaid thereon. FIG. 350 is employed for determining a training mask which defines the training regions of interest in an imager from which a training set or sets are determined. In FIG. 12A, overlaid on image 350 are four layers each with a respective color design and associated with a respective color. The layer exhibiting the shape of a triangle is associated with the color cyan. The layer exhibiting the shape of a circle is associated with the color magenta. The layer exhibiting the shape of a rectangle is associated with the yellow black. The layer exhibiting the shape of an ellipse is associated with the color black. In image 350, each pixel or group of pixels is associated with a respective layer combination identifier according to table 1 above. As can be seen in FIGS. 12A and 12B, image 350 does not necessarily include all the layers combinations. For example, image 350 does not include a combination which includes the triangle (i.e., the color cyan) with an ellipse (i.e., the color B). As such, image 350 does not include the layers combination identifier 1001. When the layers combination identifiers are determined, image 350 is segmented according to the layers combination identifiers. Training regions of interest are selected from the segments. The training regions of interest may be selected according to the size of each segment and the layers combination identifier associated with each segment (e.g., to ensure that each layers combination identifier is associated with at least one training region of interest and that registration errors are accounted for). The segments are then employed to define a mask for determining a training set for training a neural network. In FIG. 12B, encircled are three exemplary regions of interest, which may be employed to define a mask for determining a training set for training a neural network according to the disclosed technique. The mask is then applied to each layer or to an image according to the type of neural network being trained as further explained below.

Figure 13:
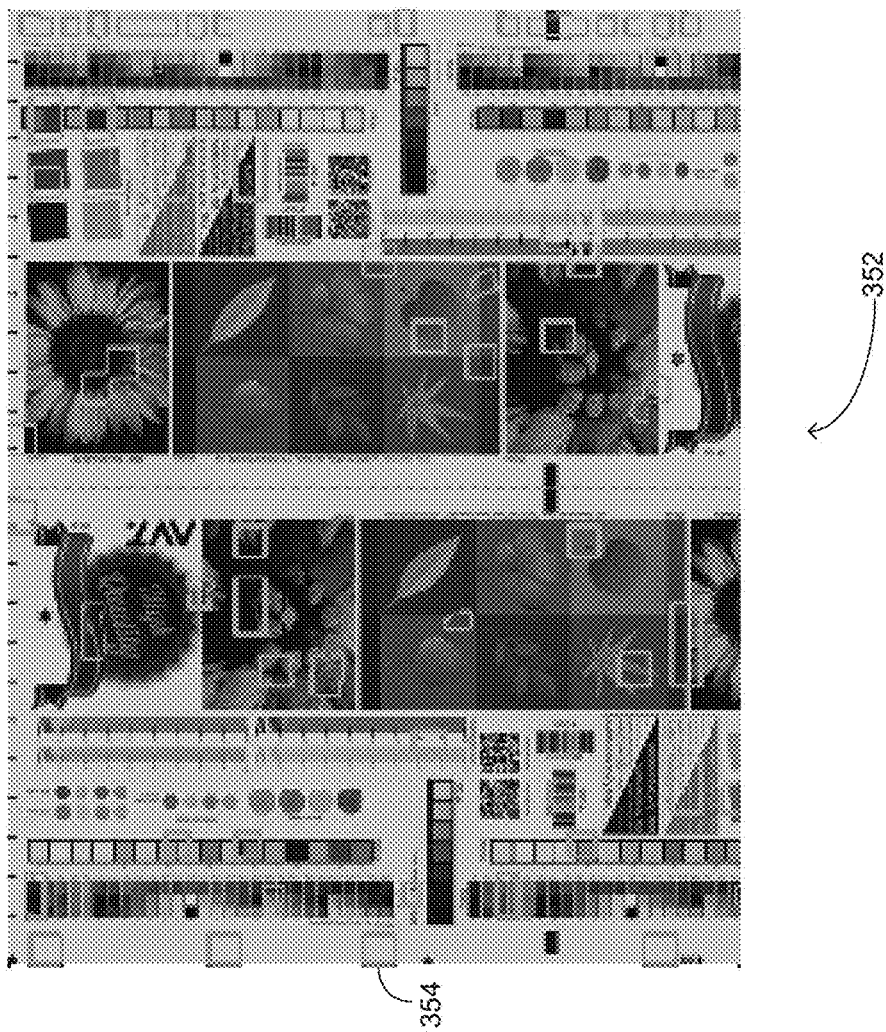
FIG. 13 is a schematic illustration of an image exemplifying the selected training region of interest, in accordance with a further embodiment of the disclosed technique.

Reference is now made to FIG. 13, which is a schematic illustration of an image, generally referenced 352, exemplifying the selected training region of interest, in accordance with a further embodiment of the disclosed technique. The training region of interest in image 352, such as training region of interest 354, are depicted on the image of FIG. 4A.

Figure 14:
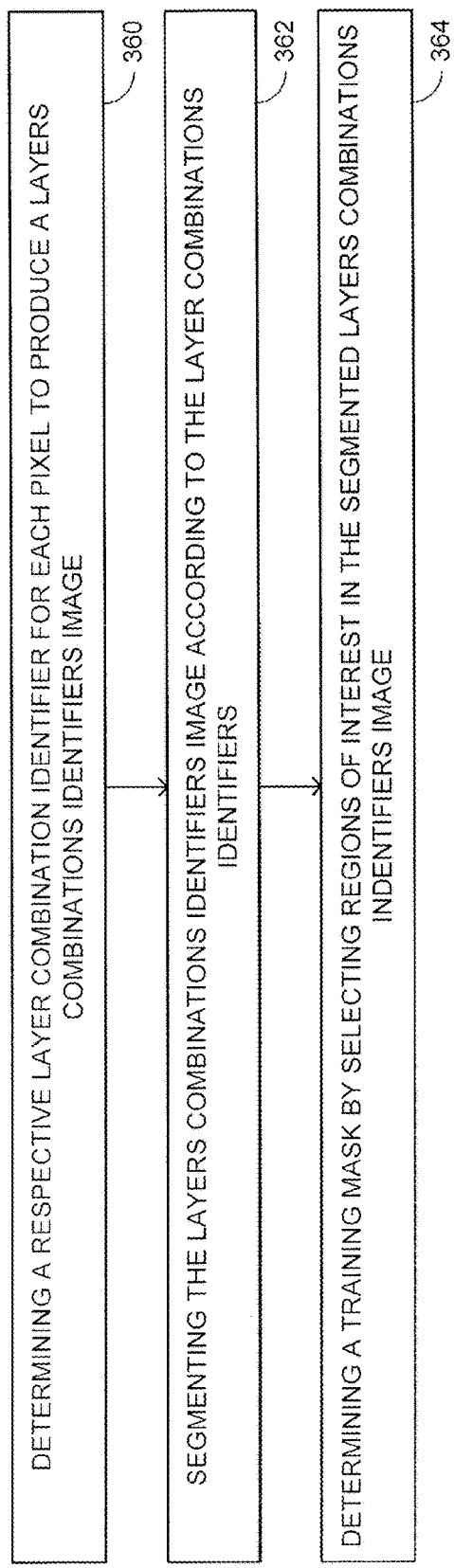
FIG. 14 is a schematic illustration of a method for selecting regions of interest for neural network training, operative in accordance with another embodiment of the disclosed technique.

Reference is now made to FIG. 14, which is a schematic illustration of a method for selecting regions of interest (i.e., determining a training mask) for neural network training, operative in accordance with another embodiment of the disclosed technique. In procedure 360, a respective layers combination identifier is determined for each pixel in the design composite image (e.g., the RGB image provided with the PDF) to produce a layers combination identifiers image. The layers combination identifier is associated with the layers associated with that pixel. The layers combination identifier is a binary number where each digit in this binary number is associated with a layer. The binary digit 1 indicates that the presence of the layer in the respective pixel location, while the binary digit 0 indicates that the layer is not present in the respective pixel location. With reference to FIG. 1, processor 104 determines a respective layers combination identifier for each pixel.

In procedure 362, the layers combination identifiers image is segmented according to the layer combination identifiers. With reference to FIG. 1, processor 104 segments the layers combination identifiers image.

In procedure 364, a training mask is determined by selecting regions of interest in the segmented layers combination identifiers image. The regions of interest may be selected according to the size of each segment and the layers combination identifier associated with each segment. With reference to FIG. 1, processor 104 determines a training mask. The training mask may then be employed for determining training sets for a neural network as further explained below.

In general the training process of neural network is sensitivity to various errors which may occur in the expected output employed for training. These errors may be, for example, registration errors, noise, defects in the image or images and the like. Thus, an image or images or selected regions therein, exhibiting low registration errors (i.e., within a predetermined range) and "good" quality (e.g., the number of defective pixels should be lower than a predetermined range). In general, a separation neural network is more sensitive to such errors. Thus, a separation neural network may be determined from a synthesized image in which errors are less probable.

Reference is now made to FIG. 15, which is a schematic illustration of a method for determining training sets for neural networks in accordance with a further embodiment of the disclosed technique. In procedure 380 a synthesis training set is determined for training a synthesis neural network employed for synthesizing an image. The training set is determined employing the design layers and a training mask. The training mask is determined, for example, as described above in conjunction with FIGS. 10A, 10B and 11. With reference to FIG. 1, processor 104 determines a training set or training a synthesis neural network.

In procedure 382, the synthesis neural network is trained to synthesize an image employing the synthesis training set.

In procedure 384, a training image is synthesized from the design layers employing the trained synthesis neural network.

In procedure 386, a separation training set is determined for training a separation neural network employed for determining separation images. The training set is determined employing the synthesized training image and the training mask In procedure 388, a separation neural network is trained to separate an image into the printed color designs which compose the image employing the separation training set.

In general, a neural network according to the disclosed technique (e.g., a synthesis neural network or a separation neural network) may be trained to incorporate the effects of various substrates (e.g., paper, carton, plastic or fibrous) of various colors, textures and which may include various colors and textures on the substrate itself. In such a case, the substrate may be considered as an additional design (i.e., a background design) with respective layers and color designs. A separation neural network may be trained to incorporate such substrates. For example, the separation neural network may include an input background node for each background layer (e.g., a background cyan node, a background magenta node, a background yellow node and a background black node for a CMYK process) as well as an input node for each printed color. Thus, the neural network can be trained to incorporate the different background colors of the substrate at the different pixel locations. Also, incorporating the effects of various substrates on the synthesized image or the separation image enables employing a different substrate for printing press setup and for the job run. For example a cheaper substrate can be employed for setup than the substrate employed for the job run, thus reducing waste.

As mentioned above, employing a synthesis neural network for synthesizing an image incorporates the effects of the background on the appearance of the synthesized image. In general, since neural networks are trained according to an expected output given a measured input, the neural network accounts for various effects the measured input may incur and still provide the expected output (i.e., with probability) without have to specifically model these effects. For example, a separation neural network for decomposing an acquired image of the printed design incorporates the effects of the order in which the colors are printed (e.g., printing green over cyan may result in a different color than when printing cyan over green in an CMYKOGV color process) as well as the characteristics (e.g., viscosity, temperature and the like) of the inks employed to produce these printed colors. As a further example, errors introduced by the measuring device (e.g., imager, spectrophotometer or densitometer) can be accounted for. Also, changes in the viscosity of the ink.

It will be appreciated by persons skilled in the art that the disclosed technique is not limited to what has been particularly shown and described hereinabove. Rather the scope of the disclosed technique is defined only by the claims, which follow.

The invention claimed is:

1. A method for generating a test set for inspection of a design being printed by a printing press, said printing press including a plurality of color units, each one of said color units printing a respective color, said design being composed of a plurality of original layers, each one of said original layers including a topography associated with a color respective thereof, said inspection at least including determining the origin of at least one defect in said printed design, the method comprising the procedures of:

generating at least one defective layer of said design, by introducing at least one selected defect to at least one selected original layer, in at least one selected location;

combining layers using a trained synthesis neural network, said layers including said at least one defective layer and remaining ones of said original layers, said trained synthesis neural network providing at the output thereof a plurality of features respective of each pixel; and generating said test set from said output of said synthesis neural network, said test set including at least one synthesized test image, said at least one synthesized test image including at least one synthesized defect at said at least one selected location, said test set being employed to determine the origin of said at least one defect.

2. The method according to claim 1, further including, prior to said procedure of generating at least one defective layer, the procedures of:

acquiring an image of a printed design;

analyzing said acquired image to identify said at least one defect in said printed design according to the acquired image.

3. The method according to claim 2, further including, after said procedure of generating said test set, the procedures of:

comparing the acquired image with at least one selected test image in said test set;

determining the origin of said at least one defect by determining the test image that best matches the acquired image.

4. The method according to claim 2, wherein after said procedure analyzing said acquired image and prior to said procedure of generating at least one defective layer, the method further includes the procedures of:

decomposing the acquired image to create separation images, by employing a trained separation neural network;

identifying said at least one defect in each of said separation images, said identifying defects including identifying the location and the type of said at least one defect, wherein said procedure of generating said at least one defective layer with selected defects at selected locations, is performed for only those colors in which said at least one defect was identified in the respective separation image.

5. The method according to claim 4, wherein training said trained synthesis neural network and said trained separation neural network includes the procedures of:

determining a synthesis training set for training said synthesis neural network, said training set being determined by employing design layers and a training mask;

training said synthesis neural network to synthesize an image employing said synthesis training set;

synthesizing a training image from the design layers employing the trained synthesis neural network;

determining a separation training set for training said separation neural network, said training set determined employing the synthesized training image and the training mask; and training a separation neural network to separate an image into the printed color designs which compose the image employing the separation training set.

6. The method according to claim 5, wherein said training mask is determined according to the procedures of:

determining a respective layer combination identifier for each pixel to produce a layers combination identifiers image;

segmenting said layers combination identifiers image according to said layers combination identifiers; and determining a training mask by selecting training regions of interest in the segmented layers combinations identifiers image, said training regions of interest are selected such that each combination identifier is associated with at least one region of interest and such that size of said training regions is larger than the registration errors between the said color units.

7. The method according to claim 6, wherein said layers combination identifier is a binary number, wherein each digit in this binary number is associated with a respective one of said original layers, wherein the value of each digit represents the presence or absence of the layer in respective pixel location.

8. The method according to claim 6, wherein said separation neural network includes an input node respective of each selected image color feature, and wherein said synthesis neural network includes an output node respective of each color being printed and at least one output node respective of a background.

9. The method according to claim 1, wherein said synthesis neural network includes an input node respective of each color being printed and at least one input node respective of a background, and wherein said synthesis neural network further includes an output node respective of each selected image color feature.

* * * * *